(12) United States Patent
Wilson

(10) Patent No.: US 7,711,793 B1
(45) Date of Patent: May 4, 2010

(54) NO SINGLE POINT OF FAILURE RAID BOX USING SATA DRIVES

(75) Inventor: Andrew W. Wilson, Fremont, CA (US)

(73) Assignee: Adaptec, Inc., Milpitas, CA (US)

( * ) Notice: Subject to any disclaimer, the term of this patent is extended or adjusted under 35 U.S.C. 154(b) by 1827 days.

(21) Appl. No.: 10/665,846

(22) Filed: Sep. 17, 2003

Related U.S. Application Data

(63) Continuation-in-part of application No. 10/198,337, filed on Jul. 17, 2002.

(60) Provisional application No. 60/306,329, filed on Jul. 17, 2001.

(51) Int. Cl.
*G06F 15/16* (2006.01)
*G06F 13/00* (2006.01)

(52) U.S. Cl. .................. 709/217; 711/100

(58) Field of Classification Search .......... 709/217; 711/100
See application file for complete search history.

(56) References Cited

U.S. PATENT DOCUMENTS

| | | | |
|---|---|---|---|
| 6,799,224 B1* | 9/2004 | Dellacona | 714/2 |
| 6,990,528 B1* | 1/2006 | Neal et al. | 709/232 |
| 2002/0147945 A1* | 10/2002 | Fox et al. | 714/47 |
| 2005/0091221 A1* | 4/2005 | Harris et al. | 707/10 |
| 2005/0246393 A1* | 11/2005 | Coates et al. | 707/200 |

* cited by examiner

*Primary Examiner*—Hassan Phillips
*Assistant Examiner*—Alan S Chou
(74) *Attorney, Agent, or Firm*—Martine Penilla & Gencarella, LLP

(57) ABSTRACT

A method for storing data is provided which includes transmitting a storage operation request to one of at least two controllers where the at least two controllers is capable of managing communication with a plurality of targets. The method further includes directing the storage operation request to an operational one of the at least two controllers when the one of the at least two controllers is inoperable. The method also includes processing the storage operation request with the operational one of the at least two controllers.

27 Claims, 17 Drawing Sheets

NO SINGLE POINT OF FAILURE RAID BOX USING SATA DRIVES

CROSS REFERENCE TO RELATED APPLICATION

This application is a continuation-in-part and claims priority from co-pending U.S. patent application Ser. No. 10/198,337 filed on Jul. 17, 2002 and entitled "INFINIBAND LAYER 4 ROUTER AND METHODS FOR IMPLEMENTING SAME IN AN INFINIBAND BASED EXTERNAL STORAGE DEVICE" which is a non-provisional application claiming priority from a U.S. Provisional Application No. 60/306,329 entitled "INFINIBAND ROUTER AND METHODS FOR IMPLEMENTING SAME IN AN INFINIBAND BASED EXTERNAL STORAGE DEVICE", filed on Jul. 17, 2001. The aforementioned patent applications are hereby incorporated by reference in their entirety.

BACKGROUND OF THE INVENTION

1. Field of the Invention

This invention relates generally to the field of computing technology and more particularly concerns optimization of RAID applications.

2. Description of the Related Art

Since the inception of computers, data protection has been one of the main concerns in designing data storage systems. Valuable data stored in hard drives can be lost due to abnormal occurrences such as human errors, equipment failures, and adverse environmental conditions. With the advent of on-line, interactive computing, the protection of data against loss has become an even more important consideration in designing data storage systems. For example, modern e-commerce enables companies to conduct all or sizable portion of their business over the Internet using computers. In such a scenario, if hard drives on a company's server computer fail, the company's business may come to a standstill. This may lead to a substantial loss in business and goodwill from its customers.

To guard against such disastrous events and enhance I/O performance, many computer systems implement a Redundant Array of Independent Disk (RAID) system, which is a disk system that includes a collection of multiple disk drives and an array controller. The disk drives are organized into a disk array and managed by the common array controller. The array controller presents the array to the user as one or more virtual disks. Disk arrays are the framework to which RAID functionality is added in functional levels to produce cost-effective, highly available, high-performance disk systems.

In RAID systems, data is distributed over multiple disk drives to allow parallel operation, thereby enhancing disk access performance and providing fault tolerance against drive failures. Currently, a variety of RAID levels (e.g., RAID level 0 through level 6) has been specified in the industry. For example, RAID level 5 architecture provides enhanced performance by striping data blocks among N disks and provides fault-tolerance by using 1/N of its storage for parity blocks, which are typically calculated by taking the exclusive-or (XOR) results of all data blocks in the parity disks row. The I/O bottleneck is thus reduced because read and write operations are distributed across multiple disks. RAID systems are well known in the art and are amply described, for example, in *The RAID Book, A storage System Technology Handbook*, by Paul Massiglia, $6^{th}$ Ed. (1997), which is incorporated herein by reference.

It is becoming very clear that serial advanced technology attachment (serial ATA or SATA) drives will soon replace ATA drives as the mass market storage solution for storage systems such as RAID systems. As such, they will enjoy significant cost advantages over other disk drives. Using these devices with a RAID controller can protect the data from loss through drive failure, but may render it temporarily inaccessible due to controller failure. For those systems where continuous data access is required, the standard solution is to use two controller cards, and allow them both to access all drives by connecting them to each SCSI cable (dual initiator) or using dual port Fibre Channel drives. However, the highly economical SATA drives are only single ported, rendering that type of solution impossible.

FIG. 1 illustrates a conventional external storage architecture 10. The storage architecture includes hosts 12 and 16 connected to an InfiniBand-PCI (IB-PCI) target channel adapter (TCA) 18 through an InfiniBand fabric 14. The Infini-Band-PCI TCA 18 is connected to a bridge 22 which is in turn connected to a RAID processor 20, memory 24 and SATA host adapters (HA) 30 and 32 which in turn are connected to storage devices 42 and 44. From an InfiniBand perspective, it requires one queue pair (QP) per host process, with the RAID processor 20 sending and receiving all SCSI RDMA Protocol (SRP) or (direct access file system) DAFS messages and generating remote direct memory access protocol (RDMA) operations to transfer data to and from the hosts. A queue pair is an endpoint of a link between communicating entities where communication is achieved through direct memory-to-memory transfers between applications and devices. Within the external RAID box all data is transferred by PCI DMA operations and control information by PCI DMA and PCI PIO.

There are numerous disadvantages to this approach, which will become more significant over time. The approach requires that all data pass through the memory block, which doubles memory bandwidth requirements and increases latency. At present, the memory pass through approach is the only option and as data throughput in other parts of the system increase, memory pass through blockage will probably become an increased bottleneck. An additional problem is the bandwidth limitations of parallel, shared busses, such as PCI which can be overloaded with data and therefore decrease data transmission throughput and efficiency. Therefore, as time progresses and data throughput needs becomes greater, the prior art data transmission architecture will generally not have enough capabilities to enable optimal data transmission. In addition, if the RAID processor 20 fails, the whole system would become inoperable. Therefore, there is a single point of failure in the system 10. Consequently, failure in just one location of the entire system can prevent data storage or retrieval from the storage devices 42 and 44.

Therefore, there is a need for a RAID system with no single point of failure that is capable of utilizing advanced routing methods thereby enhancing data transmission efficiency.

SUMMARY OF THE INVENTION

Broadly speaking, the present invention fills these needs by providing a storage methodology and system that utilizes layer 4 routers and RAID controllers to minimize single points of failure in fault tolerant storage devices. It should be appreciated that the present invention can be implemented in numerous ways, including as a process, an apparatus, a system, a device, or a method. Several inventive embodiments of the present invention are described below.

In one embodiment, a method for storing data is provided which includes transmitting a storage operation request to one of at least two controllers where the at least two controllers are capable of managing communication with a plurality of targets. The method further includes directing the storage operation request to an operational one of the at least two controllers when the one of the at least two controllers is inoperable. The method also includes processing the storage operation request with the operational one of the at least two controllers.

In another embodiment, a method for storing data is provided which includes providing a plurality of storage containers, the plurality of storage containers each having a plurality of storage devices and generating a plurality of storage volumes where each of the storage volumes includes at least one storage device from each of the plurality of storage containers. The method also includes managing each of the plurality of volumes with a corresponding storage device controller. The method also includes, when the corresponding storage device controller is inoperable, accessing data on the plurality of storage volumes through at least one operable storage device controller that is configured to access the volume managed by the inoperable storage device controller.

In yet another embodiment, a method for transmitting data in a data storage system with at least two RAID controllers and at least two L4 routers is provided which includes determining functionality of the at least two L4 routers. During a read operation, the method includes communicating the data from a storage device to a functional L4 router, and determining at least one destination host for the data. During the read operation, the method further includes transferring the data to the at least one destination host using L4 routing. During a write operation, the method includes communicating the data from a host to a functional L4 router and determining at least one destination storage device for the data. During a read operation, the method also includes transferring the data to the destination storage device using L4 routing.

In another embodiment, a storage network architecture is provided which includes at least two target devices and at least two controllers for managing the at least two target devices where each of the at least two controllers is configured to be capable of managing the at least two target devices when one of the at least two controllers is inoperable. The architecture also includes at least two switches connecting the at least two controllers and the at least two target devices. The architecture further includes at least two L4 routers where each of the at least two L4 routers is capable of communicating data between a host and the at least two target devices through one of the at least two switches and one of the at least two controllers. The L4 router is capable of facilitating remote direct memory access (RDMA) communications between the at least two target devices and the host wherein the router uses information at a transport layer to route data between transport sessions.

The advantages of the present invention are numerous. The present invention utilizes intelligent and powerful RAID system architectures with intelligent routing methods to enable the prevention of catastrophic data access loss when a single point of failure occurs. Specifically, the present invention can utilize multiple level 4 routers and multiple RAID controllers to enable usage of multiple data paths to and from disk drives. As a result, if one particular component fails, another can still direct and transmit data to the proper destination. Consequently, redundant data paths may be generated to enable confident and safe data transmission and storage. These dramatic increases in the number of required queue pairs will be referred to as "queue explosions." In addition, by use of the L4 routers, queue pair explosions in the number of required queue pairs that can occur in direct RDMA communications between RAID devices and hosts may be significantly reduced. In addition, by utilizing RDMA, data transportation may bypass the RAID controller(s) thereby enhancing data transportation efficiency by removing a potential bottleneck of data transmission. Therefore, the present invention has the ability to avoid a single point of failure while reducing congestion in a transmission media and taking full advantage of the transmission capabilities of an InfiniBand based system.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE EXEMPLARY EMBODIMENTS

An invention is described for optimizing InfiniBand based systems by usage of a layer four router to optimize data transmission. It will be obvious, however, to one skilled in the art, that the present invention may be practiced without some or all of these specific details. In other instances, well known process operations have not been described in detail in order not to unnecessarily obscure the present invention.

Most external storage box designs typically use one or more industry standard PCI busses internally to connect between the RAID processor, disk drive interconnect initiators, SAN interfaces, and even those which are connected to InfiniBand SANs. However, PCI busses (which in this document will be used to refer to all versions of PCI, including PCI-X) may be bottlenecks in external storage box designs. As utilized herein, InfiniBand can optimally serve as a PCI bus replacement to enable enhanced data throughput. Therefore, as utilized in the router described herein, InfiniBand can serve as both a PCI bus replacement and a next generation SAN, enabling the design of a flexible, very high performance external storage architecture.

With an InfiniBand system, the data traffic between the external storage unit and the hosts is transferred over the Reliable Connected (RC) transport service. Both SCSI RDMA Protocol (SRP) and Direct Access File System (DAFS) map similarly to IB RC, with IB Message SENDs used by hosts to deliver I/O requests to the controller, and IB Message SENDs used by the controller to return I/O status to the hosts. If using SRP the controller may be a RAID controller, and if using DAFS the controller may be a file system controller which may include file system functionality as well as RAID functionality. The actual data transfer is done using RDMA Writes from the storage unit for data reads, and RDMA Reads from the storage unit for data writes.

Figure 1:
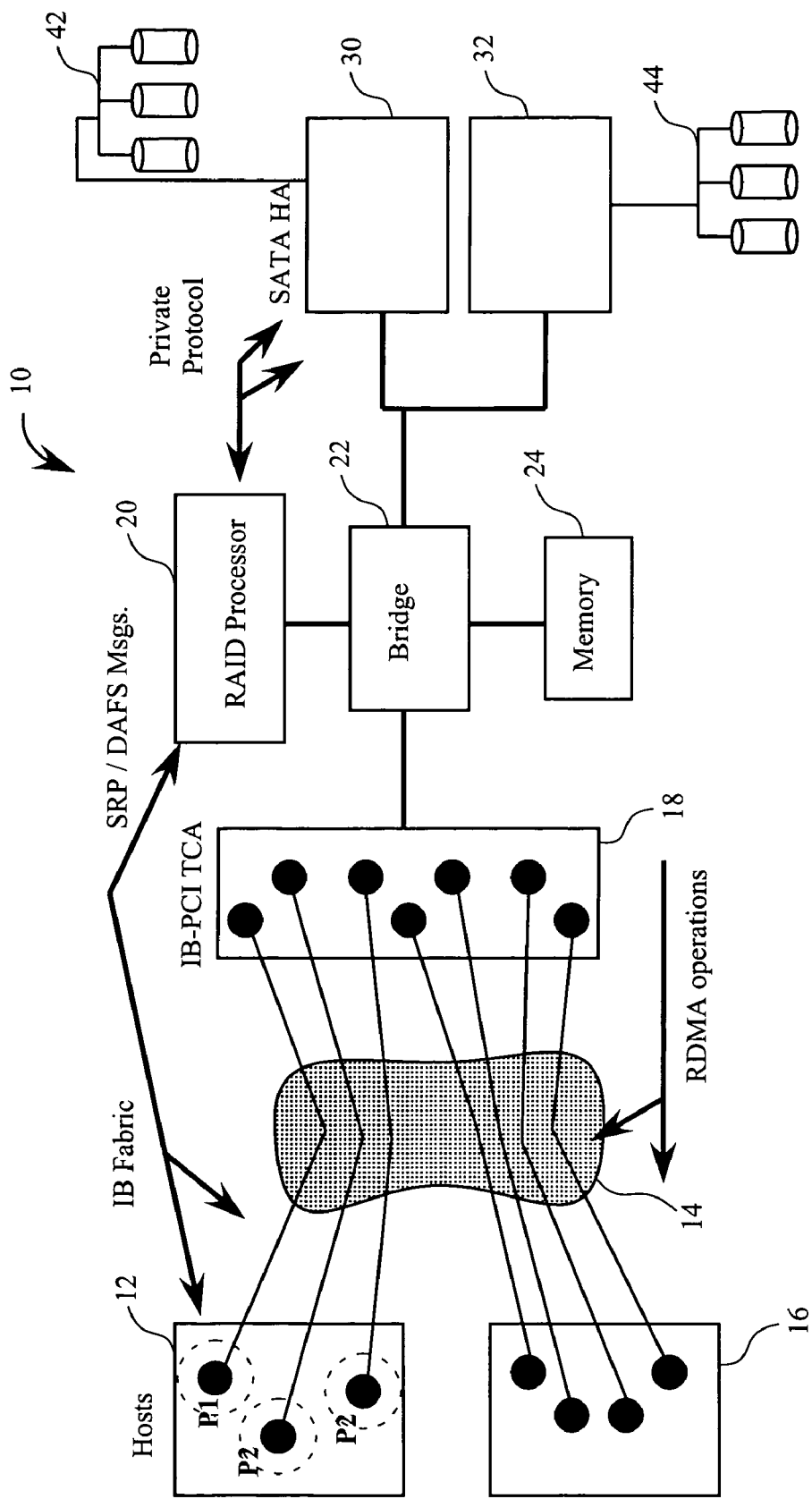
FIG. 1 illustrates a conventional external storage architecture.
Figure 2:
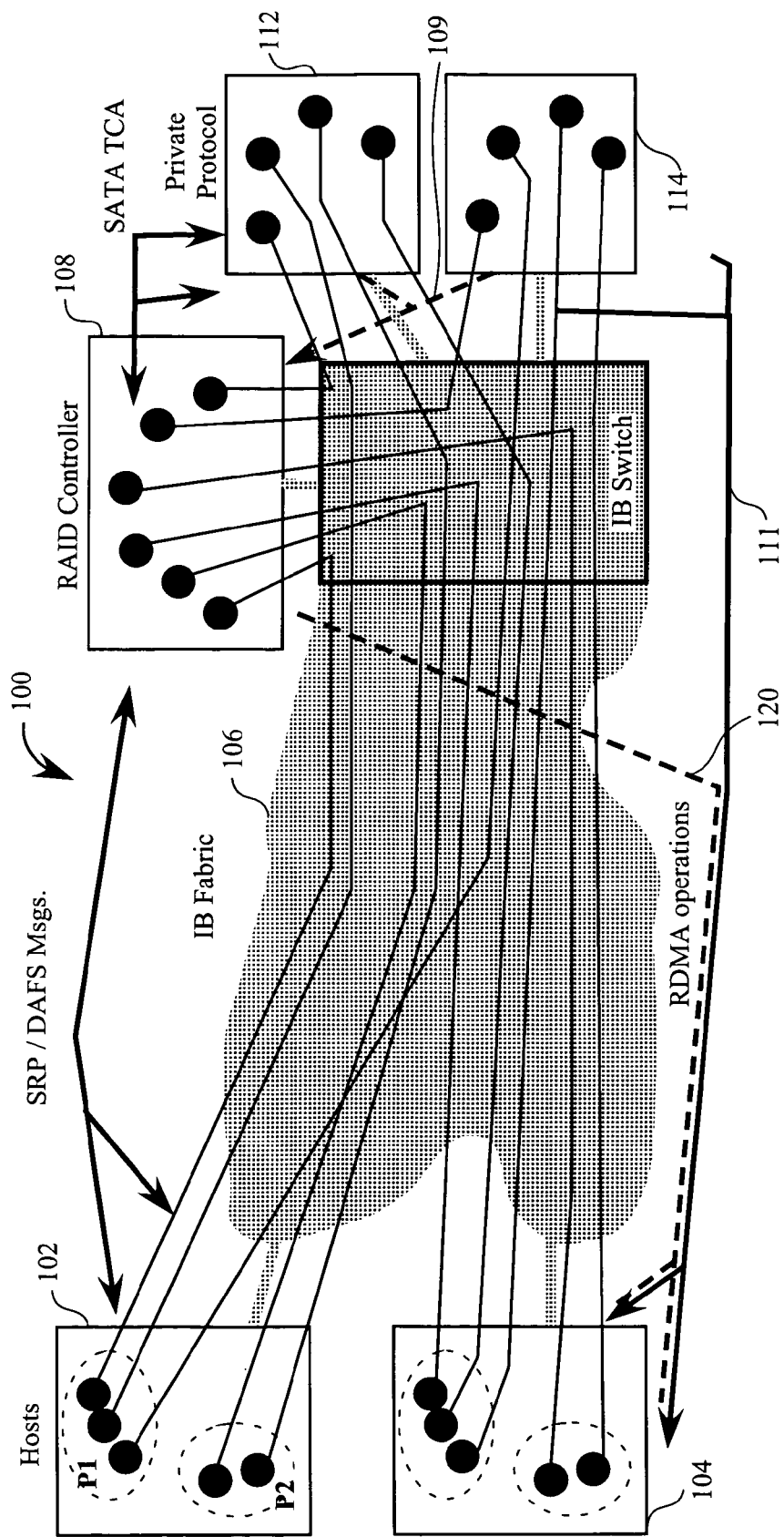
FIG. 2 illustrates an InfiniBand data transmission system showing a direct InfiniBand based approach in accordance with one embodiment of the present invention.

FIG. 2 illustrates an InfiniBand data transmission system 100 showing a direct InfiniBand based approach in accordance with one embodiment of the present invention. In this embodiment, the InfiniBand data transmission system 100 includes hosts 102 and 104 that communicate with a RAID controller 108 through an IB fabric 106 and an IB switch 110. The RAID controller 108 communicates with serial AT bus attachment (SATA) TCA's 112 and 114 through the IB switch 110. It should be appreciated that the IB fabric 106 is used in one exemplary embodiment, but other types of network fabric interconnects may be utilized. In one embodiment, the IB switch 110, RAID controller 108, and the TCA's 112 and 114 are located inside a storage box. The storage box may contain any suitable type of storage devices such as for example, disk drives, RAID, etc.

A couple of links from the IB fabric 106 are brought inside the box and connected to an internal IB switch 110. The switch 110 in turn connects to disk drive cable (SATA or SCSI) TCAs 112 and 114 in place of the PCI to disk drive cable host adapters (HAs), and to a RAID controller card 108. Initially the RAID controller 108 may have a PCI bus internally, connecting a RAID processor to the InfiniBand Fabric through an HCA or two. The card may also contain memory for Caching or Raid 5 processing. Since the disk cables are directly connected to InfiniBand, they can send and receive data from the hosts without going through the RAID controller's memory and PCI busses, increasing the system scalability enormously.

In one exemplary use of the architecture 100 described herein, a RAID 5 write and a read operation may be conducted. In both cases, the request, whether block or file, is sent as an InfiniBand message from a host to the RAID controller. The controller parses the request, then determine what disk operations are necessary to fulfill it. If it is a RAID 5 write, the controller usually has to bring the data into its own local memory through an RDMA read, as indicated by a dashed RDMA operation line 120 from the controller to the hosts. It then sends appropriate disk read and write operations through its own private protocol to the TCAs 112 and 114, which then use RDMA operations to transfer data between themselves and the RAID controller's local memory as shown by line 109. Finally, the controller 108 sends a status message to the host over InfiniBand to complete the operation.

An additional benefit comes when the request does not require access to the controller's internal memory. In such a case the controller 108 can use its private protocol to notify the TCAs to do the appropriate disk operations but give them the information they need to do RDMA directly to the host machines. In one embodiment, a typical read request sends its data back to the host over solid RDMA operation lines 111, completely bypassing the RAID controller 108. When each of the TCA's 112 and 114 is finished, it may use the private protocol to notify the controller 108, and the controller 108 in turn notifies the host 102 through an InfiniBand SEND when all TCAs 112 and 114 are finished.

This approach has many advantages from a bandwidth scaling perspective, but the switch becomes part of the overall fabric which may lead to more visibility of the internal workings of the box than might be desirable, especially from a security issue point of view. In addition, it depends on proposed extensions to both SRP and DAFS to allow grouping of several RC sessions into one logical SRP connection. But the biggest issue is the need for large numbers of QPs due to the large number of Reliable Connected (RC) sessions required. If IB is used to its full advantage, where each process on each host communicates directly with the InfiniBand Fabric (rather than going though an intermediate host operating system service), the number of RC sessions needed would grow as the product of the number of processes per host times the number of hosts times the number of TCAs and RAID controllers per storage box times number of storage boxes. This is potentially a very large number.

One way to reduce this explosion of QPs is to use Reliable Datagram (RD) service instead of RC, but RD is limited to one message at a time per EEC pair, which could pose a significant performance issue in a computer room wide InfiniBand network. This suggests that using RC to connect between the storage box and each host process while using separate RC or RD services within the box may be optimal. To do that, some form of InfiniBand (IB) transport level (i.e. IB layer 4) routing is needed.

The InfiniBand Layer 4 (IB L4) router, also known as level 4 router (transport level), as described below in reference to FIGS. 3 through 11 avoids the problems of an explosion in Queue pairs (QP) required of the InfiniBand Target Channel Adapters (TCA), especially when direct target to host processes data transfer is allowed. By routing between different transport sessions, a significant reduction in total sessions can be achieved without sacrificing performance or many-to-many connectivity. It should be appreciated that the layer 4 router described herein can be utilized to optimize any suitable type of communications such as, for example, RDMA over IP, RDMA over Fibrechannel, etc.

Figure 3:
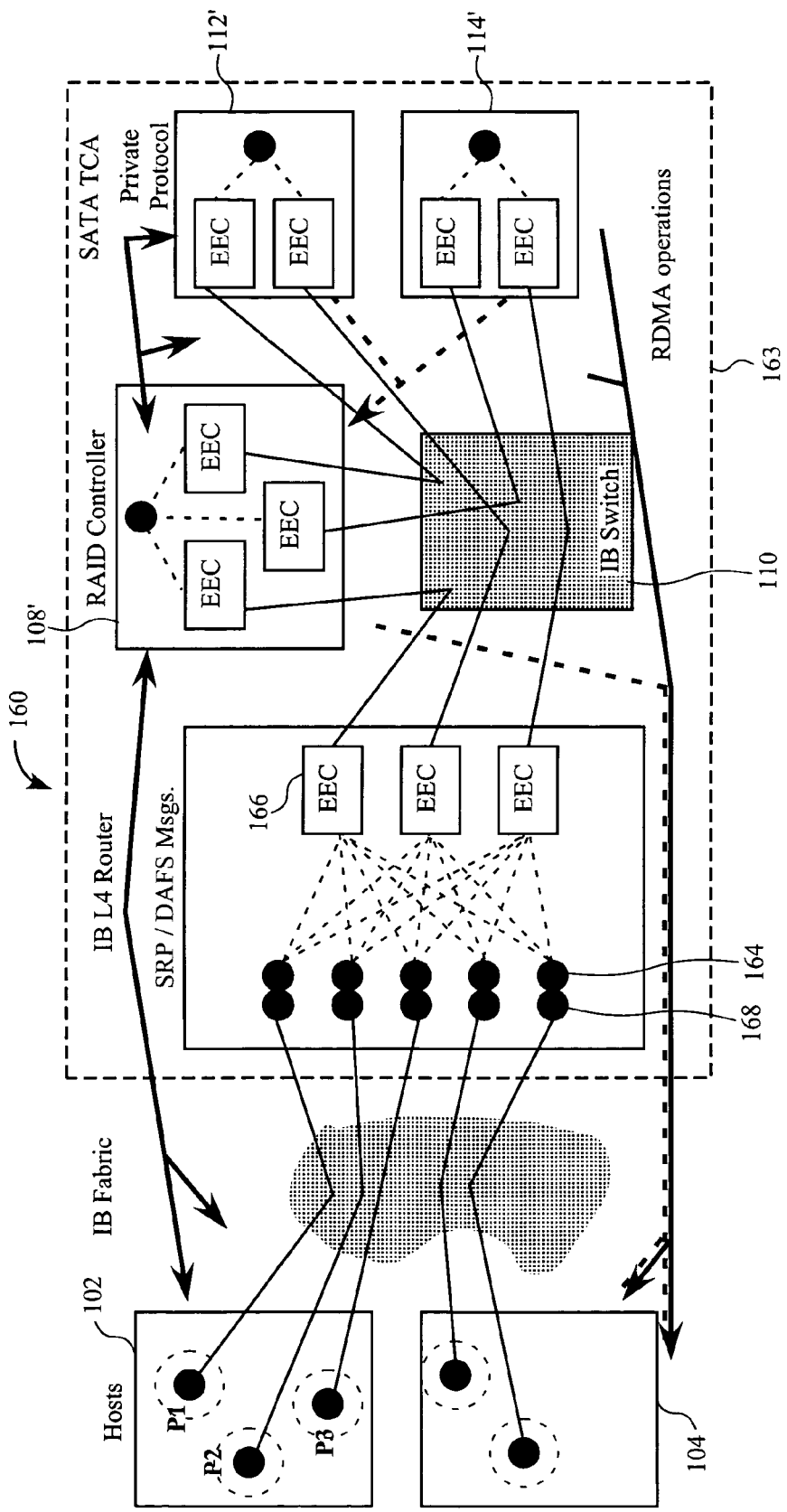
FIG. 3 shows an InfiniBand data transmission system illustrating an architecture with a layer 4 router using internal RD delivery in accordance with one embodiment of the present invention.

FIG. 3 shows an InfiniBand data transmission system 160 illustrating an architecture with a layer 4 router 162 using internal RD delivery in accordance with one embodiment of the present invention. The layer 4 router 162 is generally defined as one which uses information at the transport layer to route information between transport sessions. In an exemplary embodiment, the data transmission system 160 includes hosts 102 and 104 connected to the InfiniBand (IB) layer 4 (L4) router 162 through the IB fabric 106. It should be understood that any suitable number of hosts may be connected to the L4 router even though a limited number of hosts are shown and described in FIGS. 3 through 11 for exemplary reasons. The L4 router 162 includes a plurality of queue pairs (QP) communicating with a plurality of end to end contexts (EEC's) 166. The number of queue pairs in the system 160 (as well as other systems described in reference to FIGS. 3 through 11) may vary depending on the complexity of the L4 router and the number of connections needed to properly transport data in accordance with the present invention. The LA router 162 is capable of communicating with a RAID controller 108' through the IB switch 110. It should be appreciated that the RAID controllers as shown and described in FIGS. 3 through 11 are shown as examples and other suitable type of microprocessors that are configured to control any suitable peripheral devices may be utilized. Therefore, the L4 router as described herein may enable communications between any suitable types of hardware. In one embodiment, the RAID controller 108' can also communicate with SATA TCA's 112' and 114' through the IB switch 110. Any suitable number or types of hardware that enables communication with target devices may be used although in the embodiments described herein TCA's for disk drives are utilized.

It should be appreciated that the transport sessions need not be the same type of transport. For instance, a layer 4 network router might use port information from TCP (a transport layer protocol) to move information contained in the TCP packet to a particular ATM (asynchronous transfer mode) session. In one embodiment, QP number and/or RDMA address information may be used to route between RC sessions and optionally RD sessions. An embodiment as shown in reference to FIG. 3 uses both RD and RC sessions, and involves routing functions, while an alternative approach as described in reference to FIG. 4 removes the role of RD, while requiring a more complicated routing function. In yet another embodiment, FIG. 5 shows another approach which does not use any RD sessions between the layer 4 router and the host adapter but reduces the likelihood of QP explosions. This approach combines RD and RC to reduce the number of QP's required to a value midway between the approaches discussed in reference to FIGS. 3 and 4 while still obtaining full performance for bulk data transfer.

It should be appreciated that the router 162 (and other alternative embodiments of the router 162) may be any suitable type of hardware that may direct data as described herein such as, for example, a chip, a circuitry, etc.

In one embodiment as shown in FIG. 3, to avoid the QP explosion that results from the basic InfiniBand based approach, the InfiniBand Layer 4 router 162 may be used to transfer messages and RDMA requests between external RC sessions and internal RD sessions. Since the short latencies found within an external storage box should mitigate the performance issues of RD, it can be used within the box to allow full connectivity without an explosion of RC sessions and their associated QPs. Between the box and hosts on the fabric, use of RC enables full throughput with a reasonable number of RC sessions. In this embodiment, an RC to RD translation unit is used, which is conducted by the L4 router 162.

The router architecture indicates the basic communication paths and system components of the proposed architecture. Processes within host computers communicate with a storage box 163 over InfiniBand RC sessions. The QP's that communicate with devices outside of the storage box 163 may be known as external QP's, and QP's that communicate with devices inside of the storage box 163 may be known as internal QP's. In one embodiment the storage box 163 includes the router 162, the IB switch 110, the RAID controller 108', the TCA's 112' and 114' as well as the disk drives controlled by the TCA's 112' and 114'. The RC sessions from the host computers terminate in the L4 router 162 of the storage box 163, where the RC's QP's 168 are tightly coupled to RD QP's 164. The RD QP's in turn use a plurality of End to End Contexts (EEC) 166 to communicate with RD QPs on other internal components of the storage box 163, specifically the RAID controller 108' and the disk cable interface TCAs 112' and 114'. Since RD QPs can send messages through multiple EECs, and EECs can send messages to multiple RD QPs, full connectivity is achieved with a minimal number of reliable connections and QPs.

Determining the destination QPs for messages within the router may be accomplished as described below. All I/O request SENDs from hosts are routed to the RD QP in the controller over the router to a controller EEC session. The source QP number of the router's RD QP indicates to the controller which associated RC QP and hence which host RC session originated the request. The I/O status SENDs from controller to hosts are sent to the associated RD QP for the appropriate host RC session, thus directing them to the correct host. The RDMA requests are also sent to the RD QP associated with the desired router to host RC session's QP. Thus, RDMA write request and data routing and RDMA read request routing can be handled by the associated QP technique. In one embodiment, to route RDMA read response data back to the ultimate destination QP in the controller or TCA utilizes a method of associating the returning packets with the original request. This can be done by saving the expected Packet Sequence Numbers (PSN) of the response or acknowledgement packets along with routing information.

To further illustrate the operation of the L4 router and the storage box 163, three SCSI RDMA Protocol (SRP) requests are described. SRP is a protocol that enables transmission of SCSI commands across an InfiniBand network. SRP uses RDMA transfers to transmit SCSI data so throughput is enhanced and latencies are minimized.

In one embodiment, a host process sends an SRP request as an InfiniBand message to the storage box 163, where it is delivered to one of the RC QPs 168 in the L4 router. The RC QP passes the message to its associated RD QP 164 for forwarding to the RAID controller. In the case of a RAID 5 write, after receiving the write request from the host process, the RAID controller 108' determines the initial disk reads needed for parity generation, sending them to the TCAs 112' and 114' with instructions to direct their RDMAs to the controller's cache memory. At substantially the same time, the controller 108' issues its own RDMA read request to the host processes associated RD QP to fetch the data that is to be written into the controllers cache. The appropriate exclusive OR operations are performed, then the controller 108' issues disk write operations to the TCAs 112' and 114', again instructing them to fetch the modified data from the controller's cache through RDMA reads. When the writes are finished, the TCAs 112' and 114' notify the controller, which in turn sends an SRP completion and status message to the host process.

In one exemplary embodiment of a write operation, the SRP write request results in the controller 108' sending one or more write requests to TCAs 112' and 114', which informs them to fetch the data for those blocks directly from the host via RDMA through the router 162 to the TCAs 112' and 114'. The TCAs 112' and 114' do RD service RDMA reads to the router's associated QP of the RC session which connects the controller 108' to the host 102 (if the host 102 is initiating the write operation). The RDMA read is forwarded on to the RC session to the host 102. As each data packet of the RDMA read response arrives at the router 162, it is forwarded to the RD service QP in of the TCA's 112' and 114' which originated the request. RDMA read responses from several hosts could arrive for the same QP simultaneously. The packets from these RDMAs cannot be interleaved without violating the RD protocol, so the coupled RD-RC QPs functions as a transport level message switch, blocking other RDMA responses from other RCs until a given RDMA response is fully transferred to the RD QP.

When each of the TCA's 112' and 114' (if data is to be written to the disks controlled by the TCA's 112' and 114') has completed its RDMA read(s) (or optionally disk writes) for a given request, it sends a completion and status message back to the controller 108'. When the controller 108' receives completion messages from all of the TCAs 112' and 114' involved in a host request, it sends an SRP status message back to the host process.

In one exemplary embodiment of a read operation, the SRP read request results in the controller 108' sending one or more read requests to TCAs 112' and 114', which informs them to read selected blocks and send those blocks directly back (via RDMA through the router) to the host QP. As data streams into each TCA from the selected disk drives, it will be sent to the appropriate router RD QP using RDMA writes. The selected QP will be the one associated with the RC QP of the host process' RC session. The RDMA write will be forwarded on to the RC session. Note that RDMA writes from several TCAs could arrive for the same QP simultaneously. Similarly to RDMA read responses, the packets from these RDMAs cannot be interleaved without violating the RC protocol, so the coupled RD-RC QPs will have to function as a transport level message switch, blocking other RDMA requests and messages from other EECs until a given RDMA or message is fully transferred to the RC QP.

When each of the TCA's 112' and 114' has completed its RDMA (s) for a given request, it sends a completion and status message back to the controller 108'. When the controller 108' receives completion messages from all TCAs 112' and 114' involved in a host request, it sends an SRP status message back to the host process. The RDMAs may still be in progress on the RC session, but all have been queued up ahead of the status message, so the host process does not "see" the completion message until RDMAs have written the data to the host memory.

If the external storage box 163 is being accessed at the file level through DAFS, operation is similar to that described above, except that the controller 108' also performs file system functions as well as the RAID functions. In such a scenario, it may be useful for the RAID controller 108' to have a much larger cache, and have disk read data sent to it as well as to the L4 router 162. In one embodiment, two separate RDMA writes are employed, one to the L4 router 162 and one to the controller 108'. It should be appreciated that any other suitable type of communication may be employed for the purpose of sending data to both the L4 router and one to the controller 108' such as, for example, an InfiniBand multicast.

It is envisioned that the companion QPs may actually be able to share some resources, since they are permanently coupled together. Also, while the figure shows only one EEC connection between each IB device, more can be added to improve throughput by increasing the number of concurrent RDMA requests per device. This may be especially important for disk writes, which turn into RDMA reads. Disk reads, which turn into RDMA writes can be pipelined through the router and the RC session, improving their performance. Various methods are known for allocating requests to EECs that will produce good performance on average.

Figure 4:
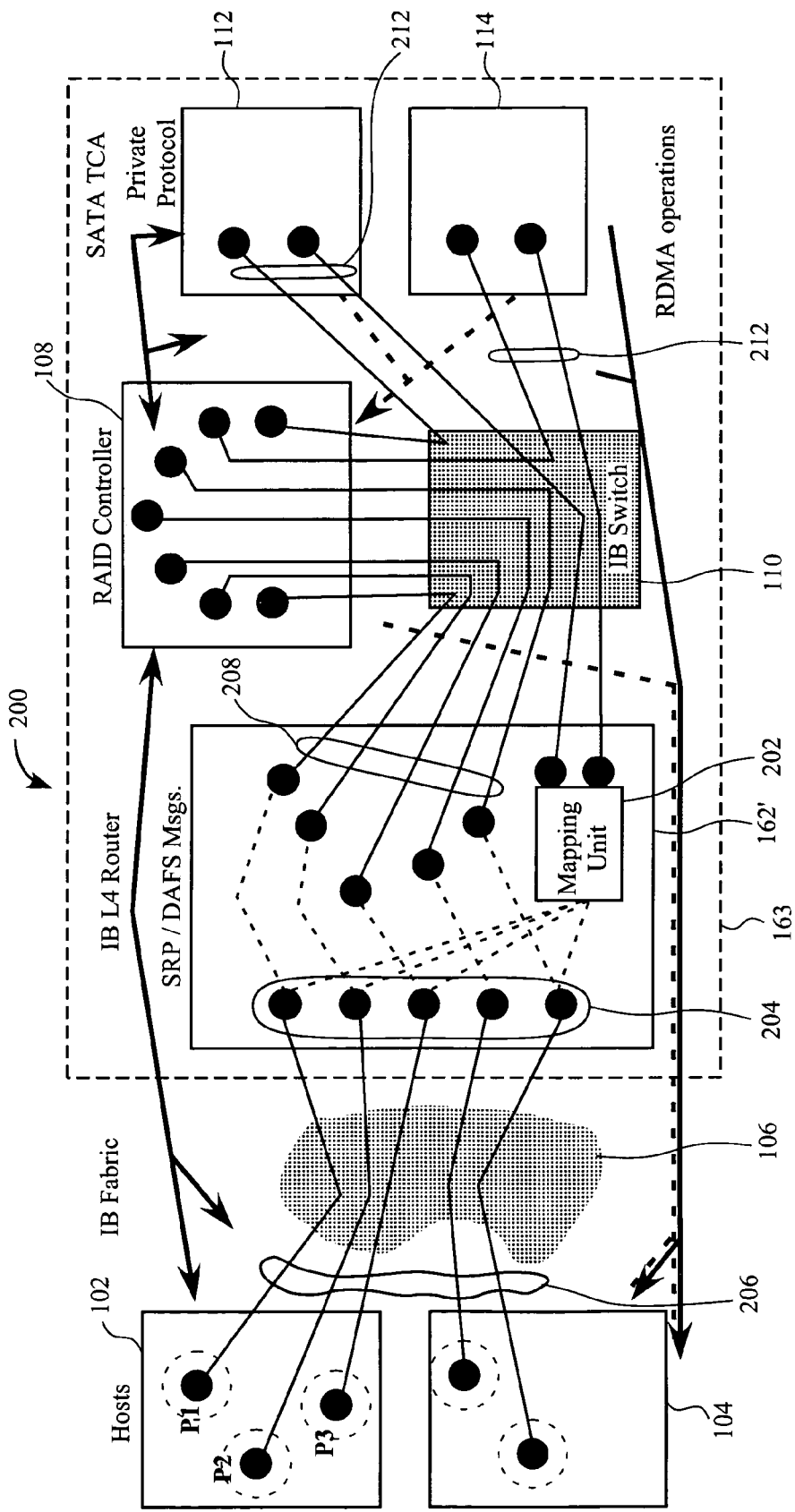
FIG. 4 illustrates an InfiniBand RC internal transport system based approach in accordance with one embodiment of the present invention.
Figure 5:
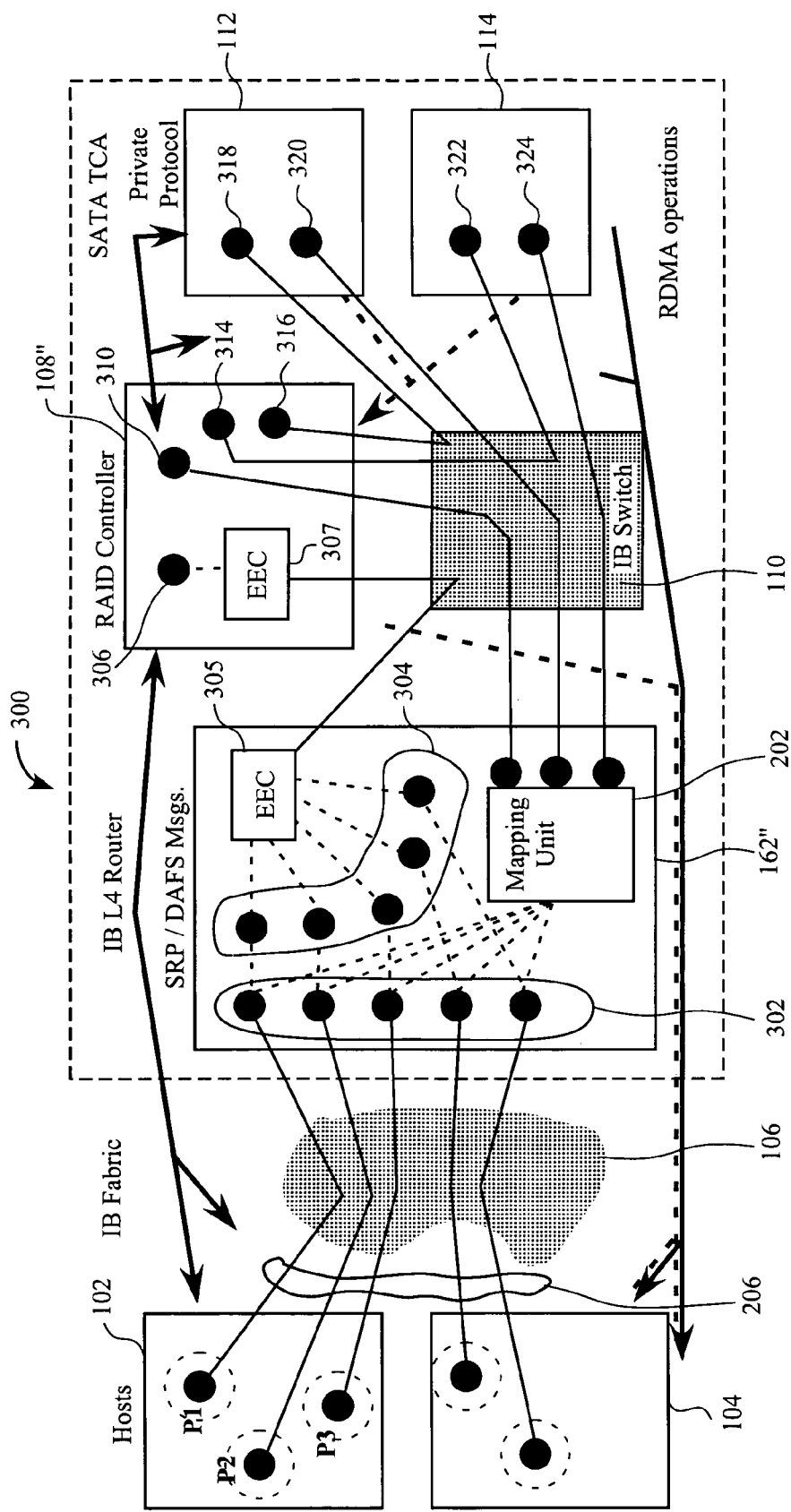
FIG. 5 shows an InfiniBand transport architecture with RD transport between a router and a controller in accordance with one embodiment of the present invention.

FIG. 4 illustrates an InfiniBand RC internal transport system 200 based approach in accordance with one embodiment of the present invention. Another way to avoid the QP explosion that would result from the InfiniBand approach as described in reference to FIG. 2 is to use only RC sessions and devise a method to map RDMA requests to the appropriate hosts. Therefore, the implementation issues of RD service can be completely eliminated if RC service is used to communicate SRP requests and status between the controller 108 and a router 162'. The host processes would then communicate using RC sessions with QPs in the L4 router 162' in the external storage box 163, just as the embodiments described in reference to FIG. 3. However, in a preferable embodiment, another set of RC sessions may be used to communicate between the L4 router 162', the RAID controller 108 and the disk attach TCAs 112 and 114, rather than RD sessions.

The InfiniBand RC internal transport system 200 includes hosts 102 and 104 which are connected to an IB 14 router 162' though the IB fabric 106. The L4 router 162' includes a plurality of QP's 204 (each of the pairs are shown as communicating by a broken line) and a mapping unit 202. As can be seen from FIG. 4, there are four groups of RC sessions: host to L4 router 206, L4 router to controller 208, L4 router to TCA 210, and finally controller to TCA 212. In one embodiment, the L4 router to TCA sessions 210 are only used for TCA to host RDMA traffic which makes it possible for the L4 router to determine the ultimate destinations of arriving packets.

Every host to router RC session has a companion router-controller session. These session pairs are used for all host to controller communication. The router passes arriving SENDs from the host-router sessions to the controller over the companion router-controller session. Similarly, it passes SENDs and RDMA requests arriving from the controller 108 to the companion host-router session for delivery to the appropriate host. Pairing these sessions up avoids the need for any additional addressing in the RC sessions, which is necessary because there aren't any additional addressing fields available.

In this embodiment, the controller 108 parses incoming SRP and DAFS messages, determines what disk accesses are required, and communicates the accesses to the TCAs 112 and 114 through a private protocol. The TCAs instruct their attached disks to perform the operations, and use RDMAs to send or receive data from the hosts 102 and 104. These RDMAs are sent over the router-TCA sessions, where the mapping unit 202 determines which host-router session they are destined for. The mapping unit 202 may be any suitable type of table, database, or information containing structure that may store mapping information which may utilized to enable a proper destination for a received data packet.

In one embodiment, the mapping unit 202 determines the appropriate QP to forward the RDMA request to. As with RC SENDs, the headers do not contain any addressing information that could be directly used to directly route a given request to the correct QP. However, RDMAs include a 64 bit virtual address header, which can be used by the mapping unit 202 to determine the correct destination QP. Therefore, in this embodiment, an additional level of address virtualization is used within the storage box 163. The mapping unit 202 uses the virtual address supplied by an RDMA from a TCA to look up the original host supplied virtual address and appropriate host to router session QP number. The packets for the RDMA are then forwarded to the retrieved QP number, and appropriate additional information is stored to route returning RDMA read packets back to the appropriate router to TCA session.

In another embodiment which routes message SENDs between a host and the controller 108 with RC, the routing of SENDs to the correct router to the controller RC session is done by determining which router QP is the companion of the host to router RC session's QP. The RC QP contains all the rest of the information necessary to find its QP in the controller 108. Similarly, companion session information is all that is required for routing in the reverse direction.

In another embodiment where RC service RDMA requests are routed, the RC service RDMA request headers do not contain any addressing information that could be used to directly route a given TCA to router request to the correct router to host RC session (i.e. QP endpoint). However, RDMAs include a 64 bit virtual address header, which can be used by the mapping unit 202 to determine the correct destination QP. In essence, an additional level of address virtualization is required within the storage box. The mapping unit 202 uses the virtual address supplied by an RDMA from a TCA to look up the original, host supplied virtual address and appropriate host to router session QP number. The packets for the RDMA are then forwarded to the retrieved QP, which then sends them over its RC session to the QP in the host.

FIG. 5 shows an InfiniBand transport architecture 300 with RD transport between a router 162" and a controller 108" in accordance with one embodiment of the present invention. In one embodiment as described herein, RD services between the route 162" and the TCAs 112 and 114 can be replaced by RC services, provided a method of determining the correct routing for RDMA requests is utilized. FIG. 5 indicates the basic communication paths and system components of one embodiment of the InfiniBand transport architecture 300. As with what was described in reference to FIG. 3, processes within host computers communicate with the storage box over InfiniBand RC sessions and RD is used to transport message SENDS between the router and the Controller. However, RDMA between the router 162" and the TCAs 112 and 114 uses RC sessions. Also, RC sessions can be used for controller to TCA transfers, eliminating the need for RD support in the TCAs 112 and 114.

In one exemplary embodiment, hosts 102 and 104 are connected to an IB L4 router 162" through the IB fabric 106. The IB L4 router 162" includes a mapping unit 202 and includes EEC 305 to enable RD communication with a RAID controller 108". The IB L4 router 162" contains plurality of QP's 302 for RC connections between it and the hosts 102 and 104 while having a plurality of QP's 304 for RD connections for communications with the RAID controller 108". The RAID controller 108" includes QP 306 connected to an EEC 307 for RD communications with the EEC 305 that is connected to the plurality of QP 304 within the LA router 162". The RAID controller 108" also includes a QP 310 that is connected to a QP 312 so the RAID controller 108" may communicate with the mapping unit 202 located within the L4 router 162". The RAID controller 108" also has QP's 314 and 316 that are coupled with QP's 322 and 318 respectively within the TCA's 112 and 114. The TCA's 112 and 114 also include QP's 320 and 324 which may communicate with QP's 326 and 328 respectively of the mapping unit 202 without going through the RAID controller 108". The mapping unit 202 may direct the data from the TCA's 112 and 114 to the appropriate host by determining the appropriate QP of the RC to send the data to.

Determining the destination QPs for message SENDs within the router is the same as for what was described in reference to FIG. 3. In this embodiment, all I/O request SEND messages from hosts 102 and 104 are routed to the RD QP 306 in the controller 108" over the router to controller EEC session. The source QP number of the router's RD QP indicates to the controller 108" which associated RC QP and hence which host RC session originate the request. The I/O status SEND messages from controller to hosts are sent to the associated RD QP for the appropriate host RC session, thus directing them to the correct host.

In another embodiment the use of RD between the controller 108" and the router 162" may be substituted by defining a private encapsulation to supply the extra QP addressing information. This could be accomplished by using an extra header in each SEND message that is stripped off by the router 162". In such an embodiment, the header is used in both directions, as the router 162" supplies the RC QP source number in SEND messages it forwards to the controller on behalf of the hosts 102 and 104 as well. The private routing protocol could also enable one to define special commands to allow the controller 108" to update Router mapping tables etc.

The TCA to router RC sessions determines which router to host RC sessions to map their RDMA writes and read requests to, using the mapping unit 202. Typically, the RC headers do not contain any addressing information that could be used to directly route a given request to the correct QP. However, RDMAs include a 64 bit virtual address header, which can be used by a mapping unit to determine the correct destination QP. In essence, an additional level of address virtualization may be used within the storage box. The mapping unit 202 uses the virtual address supplied by an RDMA from a TCA to look up the original, host supplied virtual address and appropriate Host to Router session QP number. The packets for the RDMA are then forwarded to the retrieved QP number, and appropriate additional information is stored to route returning RDMA read packets back to the appropriate Router to TCA session.

Controller initiated RDMA requests may use the RD service between the controller 108" and the router 162", however they could also use RC and the same mapping hardware as the TCA initiated requests. Using the RC service may improve performance because the RDMA traffic would be over RC sessions all the way, and would provide a consistent mechanism for all bulk data transfers.

For the most part, the operation of the three example SRP requests are similar to that described in reference to FIG. 3. Host to Controller communication may be identical, using the same combination of RC and RD. The actual data transfers may be by RDMA, but this time using RC sessions for the entire path. In the case of a RAID 5 write, the initial disk reads needed for parity generation will use RDMA writes over the controller 108" to TCA RC sessions to place data the controller's cache memory. The Controller's RDMA read requests to the host process is sent via a Controller to Router RC session rather than using RD service. The mapping unit may use the RDMA virtual address to determine which Host to Router RC session to use for the transfer into the controller's cache. Once the appropriate exclusive OR operations are performed, the controller issues disk write operations to the TCAs 112 and 114, again instructing them to fetch the modified data from the controller's cache through RDMA reads over RC sessions. When the writes are finished, the TCAs 112 and 114 notify the controller, which in turn sends an SRP completion and status message to the host process.

In one embodiment, when a write is conducted where the disks are configured as something other than RAID 5 such as, for example, JBOD, RAID 0, RAID 1, the SRP write request results in the controller 108" sending one or more write requests to TCAs, which will inform them to fetch the data for those blocks directly from the host via RDMA through the router 162" to the TCAs 112 and 114. The TCAs 112 and 114 sends RC service RDMA read requests to the mapping unit 202 of the router 162", which then forwards them on the appropriate RC session which connects the controller 108" to one of the hosts 102 and 104 (depending on which host made the write request). As each data packet of the RDMA read response arrives at the router 162", it is forwarded to the RC service QP in the TCA which originated the request, using the saved PSN mapping information in a similar fashion to that used in above as discussed in reference to FIG. 3. After completion of all RDMAs and disk operations, an SRP status message will be sent back to the host.

Disk reads are also processed in essentially the same manner as discussed above in reference to FIG. 3, except for the use of virtual address based mapping at the router 162". In this case it is the RDMA write operation which is routed to the appropriate Host Controller RC session using the virtual address mapping units.

The approach as described by FIG. 5 utilizes RC sessions for all RDMA transfers, with routing based on virtual address mapping techniques. It also uses RC sessions to communicate disk commands to the TCAs. However, this approach still uses RD services to communicate SRP messages between the Router and the Controller.

Figure 6:
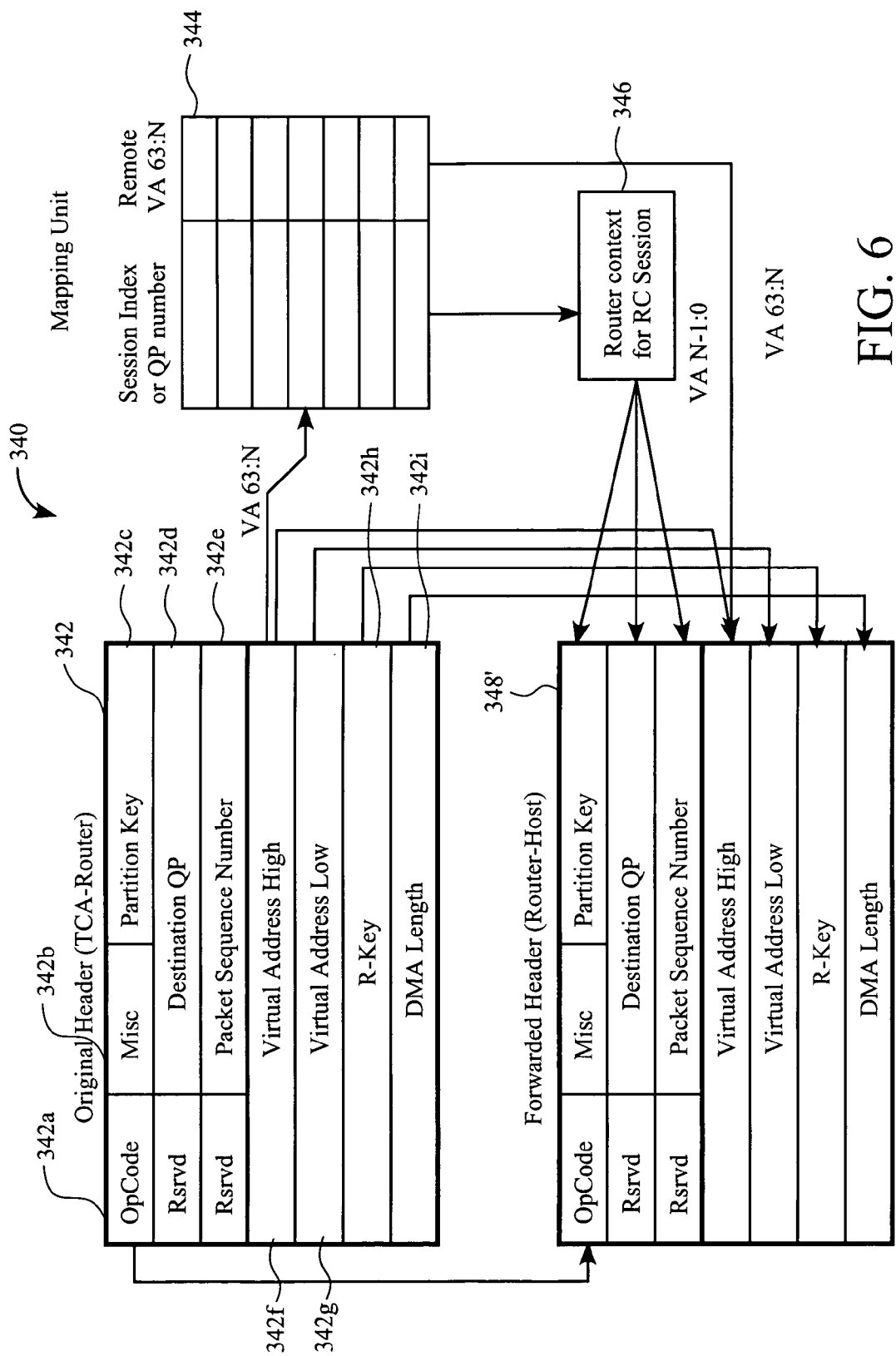
FIG. 6 illustrates an RDMA request mapping table in accordance with one embodiment of the present invention.

FIG. 6 illustrates an RDMA request mapping table in accordance with one embodiment of the present invention. An original InfiniBand header 342 sent from a TCA to a router with data in response to a read request includes Opcode 342*a*, miscellaneous data 342*b*, partition key 342*c*, destination QP 342*d*, packet sequence number 342*e*, virtual address high 342*f*, virtual address low 382*g*, R-key 342*h*, and DMA length 342*i*. As indicated in FIG. 5, a forwarded header 348 sent from a router to a host would obtain the OpCode 342*a*, most of the virtual address 342*f* and 342*g*, the R-Key 342*h* and the DMA Length 342*i* from the original header 342. The destination QP and the higher order bits of the virtual address of the forwarded header would come from an address mapping table 344 and derived from a router context for RC session 346. The particular entry would be determined by the high order bits of the original virtual address.

The number of entries in the mapping table 344 would determine how many SRP requests could be handled at one time. When the controller received a new SRP request, it would allocate a new page table entry, unless the request could be accommodated by an existing entry. It is quite possible that one request could end up crossing a page boundary and require two entries, or, at least in theory, be so large that it required two or more entries. The entry(ies) would be filled in with the QP number and actual InfiniBand virtual address, and the individual TCAs would be given the local virtual addresses to use for their RDMA requests. An SRP request that was striped across several drives would result in multiple RDMA requests, but not necessarily multiple mapping table entries.

A typical SRP Read transaction would proceed as follows. An SRP read request from a process in the host 112 comes into the router 162 as an RC SEND message. The SEND is forwarded by the router to the companion RC session, and eventually delivered to the RAID controller. The RAID controller interprets the command, determines which TCAs and drives contain the requested blocks, and generates the appropriate disk read commands. It also takes the InfiniBand virtual addresses and maps them to a range of free local virtual addresses. The storage box local virtual to remote virtual translation, and the appropriate QP number are passed to the router 162 by some control message protocol. The local virtual addresses along with the original R-Key and the disk commands are passed to the TCAs 112 and 114. When the TCAs 112 and 114 begin reading in the disk data, they will generate RDMA requests to the router 162, using the local virtual addresses for the remote address, and the host supplied R-Key. When the router 162 receives the initial RDMA packet, it uses the storage box local virtual address to look up the stored remote virtual address and router QP number. It could also have its own copy of the R-Key to compare against the supplied R-Key as an extra RDMA validation step. The router 162 switches at the message level, so once the FIRST packet of a multi-packet RDMA write is sent to the outbound QP, a connection will be established that will persist until the LAST packet is received. The outbound QP will queue, delay or reject any other SENDs or RDMA requests until the current request is finished, since messages cannot be interleaved on a given RC session. More details of how all this could be accomplished will be given in the Router detail section.

Figure 7:
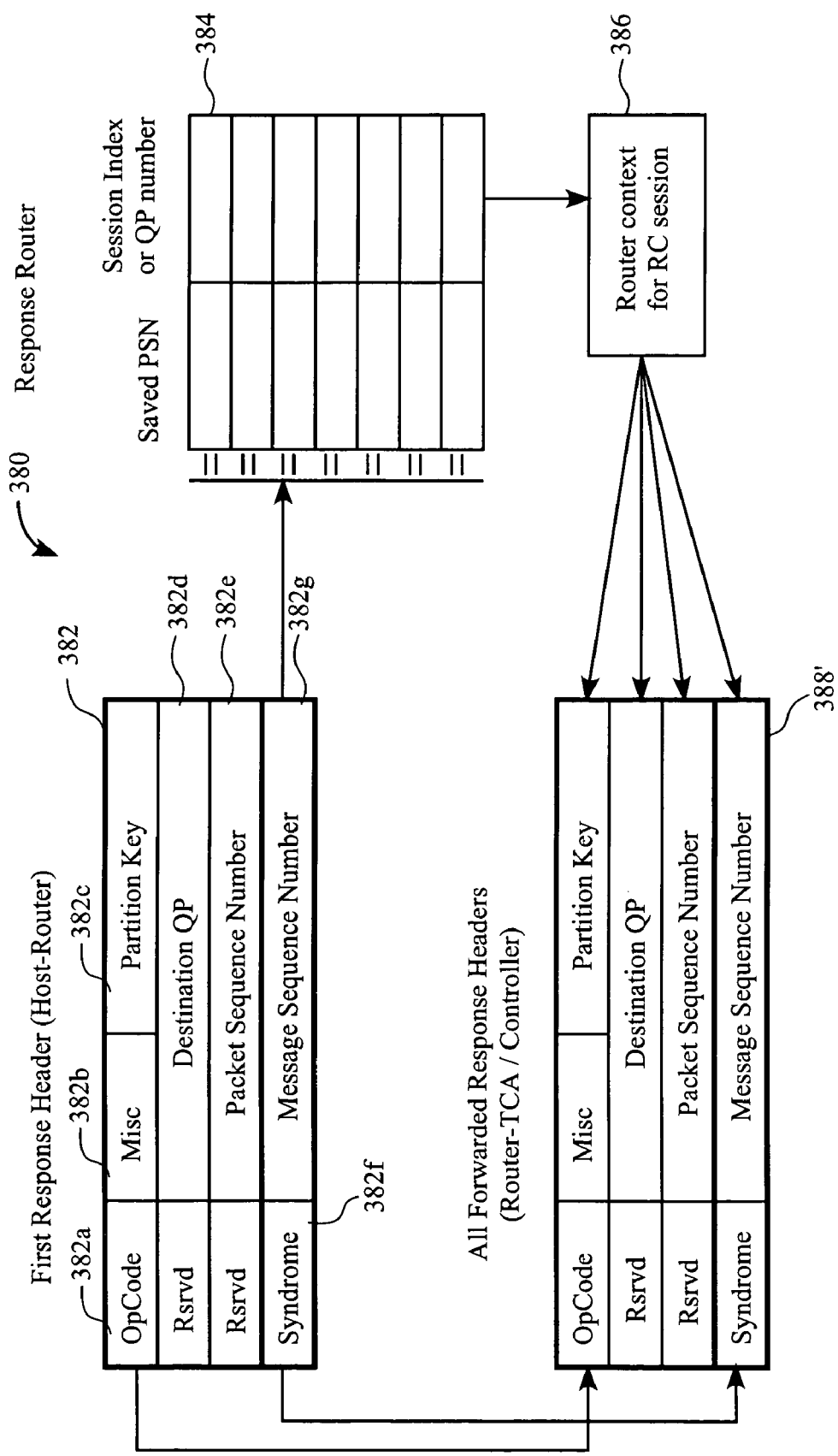
FIG. 7 shows an RDMA response mapping table in accordance with one embodiment of the present invention.

FIG. 7 shows an RDMA response mapping table in accordance with one embodiment of the present invention. In one embodiment, the response mapping table is utilized when a disk write data is sent from the host 102 to the TCAs 112 and 114 through the router 162. A first response header 302 includes OpCode data 302*a*, Misc data 302*b*, partition key data 302*c*, destination QP data 302*d*, packet sequence number data 302*e*, syndrome data 302*f*, and message sequence number data 302*g*. In one embodiment, the Opcode data 302*a* and the syndrome data 302*f* from the first response header 302 is included in the forwarded response header 308.

A disk write request results in one or more RDMA read(s) which have response data that needs to be routed to the correct Router-TCA session. As shown in FIG. 6, the only information available to direct the returning response packets is the Packet Sequence Number of the first packet. These PSNs could be stored in a Content Addressable Memory (CAM) or hash table for lookup by the Router when the RDMA read response data arrives. Once a PSN match was found, the corresponding QP number of the router 162 to TCA RC session would be retrieved and used for all packets of the response.

Thus, a disk write would proceed similarly to a disk read, with the SRP write message forwarded to the controller 108, which would then inform one or more TCA(s) to initiate disk writes. The TCA(s) would send RDMA reads to the host making the disk write request to acquire the data. The RDMA read requests would be mapped according to the high order virtual addresses as done for RDMA writes, and would be forwarded on to the host. At the same time, the Router would record the PSN of the first expected response packet in a table for that QP (or a hash of the PSN and QP number if a common table is used) along with the QP number of the session on which the request arrived from the TCA. Later on, when the FIRST or ONLY packet of the response arrives, the PSN and host-router session QP number would be used to retrieve the router-TCA session QP number, and that packet, plus any additional packets in the response, would be forwarded to that QP and hence to the originating TCA. When all TCA(s) had received their data and written it to disk, the controller would generate an SRP status message, the same as for a disk read operation.

Figure 8:
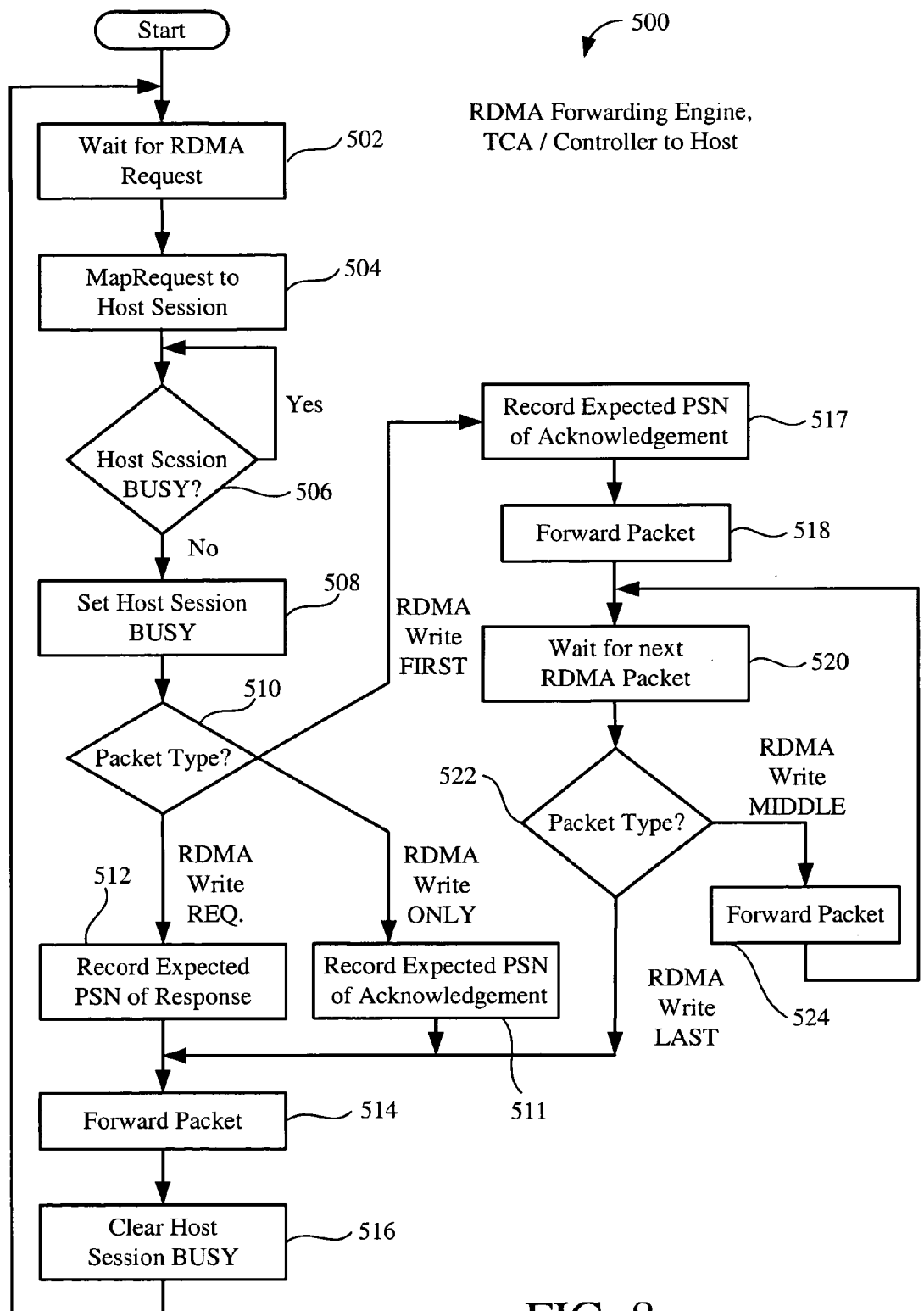
FIG. 8 defines a flowchart that illustrates the methodology to forward packets from a TCA-Router session to a Host-Router session in accordance with one embodiment of the present invention.

FIG. 8 defines a flowchart 500 that illustrates the methodology to forward packets from a TCA-Router session to a Host-Router session in accordance with one embodiment of the present invention. Messages (SENDs) and RDMA requests arriving from the hosts do not have addressing information beyond the router destination QP. The router must have a pre-defined final destination for these requests and their associated packets. Fortunately, messages from the hosts are high level SRP or DAFS requests which must be sent to the RAID/file system controller and are never sent to the individual TCAs, resulting in a trivial routing function. That is, SENDs arriving from any host are routed to a pre-defined destination QP which is on the controller's InfiniBand channel adapter. In addition, the hosts do not do RDMA accesses with either storage protocol, so any arriving RDMA requests would also go to the controller, and be treated as higher level protocol errors.

In one embodiment, the router can use cut through routing in many cases, resulting in a very minimal latency. However, intermixing packets are avoided from two SENDs or RDMA writes that are destined to the same Host-Controller session. Essentially, the router acts as a message switch, rather than a packet switch. Since InfiniBand tags individual SENDs and RDMA data packets with ordering information, the extent of an individual message may be determined. A new SEND or RDMA write would arrive with a packet labeled "FIRST" or "ONLY". If "FIRST", then the router would maintain the path until a corresponding "LAST" packet was seen. If an "ONLY" packet was seen, then the message is only one packet long anyway, so there is no issue.

In one embodiment, the method begins with operation 502 which waits for an RDMA request. After operation 502, the method moves to operation 504 which maps the request to a host session. Then operation 506 determines whether the host session is busy. If the host session is busy, operation 506 is repeated. If the host session is not busy then the method moves to operation 508 which sets the host session as being busy. After operation 508, the method moves to operation 510 which determines a packet type. If the packet type is an RDMA Write FIRST then the method moves to operation 517. If the packet type is RDMA Write ONLY then the method moves to operation 511 which records expected PSN of Acknowledgement. If the packet type is RDMA Read REQUEST then the method moves to operation 512 which records expected packet sequence number of response.

Operation 517 records expected PSN of Acknowledgement. After operation 517, the method moves to operation 518 which forwards a packet. After operation 518, the method moves to operation 520 waits for next RDMA packet. After operation 520, the method proceeds to operation 522 which determines the packet type. If the packet type as determined by the operation 520 is RDMA Write MIDDLE then the method moves to operation 524 which forwards the packet and returns to operation 520. If the packet type as determined by operation 520 is a RDMA Write LAST packet then the method moves to operation 514. After one of operations 511, 512, and 522, the method moves operation 514 which forwards the packet. Then operation 516 clears the host session busy and returns to operation 502.

Therefore, after a packet for a new RDMA request arrives it is determined which host it is for. If the method as described in FIG. 3 is used, the routing is implicitly the affiliated QP of the RD QP within the router to which the RDMA request was directed. If the method as described in FIG. 4 is used, then the high order VA bits are used to index into a mapping table which contains the QP number of the Host-Router session to use. Once the correct Host-Router session is determined, it is locked for exclusive access by the RDMA request, assuming it is not already locked by another RDMA request. FIG. 8 indicates sequentially testing and setting a BUSY flag, but in practice this may be performed atomically to avoid race conditions, and can be completely in hardware.

In one embodiment, RDMA read requests are single packets, which are forwarded on to the host after recording any information required to route the RDMA read Response packets back to the TCA. In one example of a RDMA packet configuration, the RDMA write packets may have the ONLY OpCode, the packets are simply forwarded on, since no additional packets will follow. For both the RDMA read requests and RDMA write ONLY packets, the host session can be unlocked as soon as the packet is sent.

In another example, an initial RDMA packet may be a FIRST packet of an RDMA write, indicating that more packets will follow. Since multi-packet RDMA transfers are not interleaved within a session, the state machine can latch the QP mapping information and then dedicate itself to transferring the remaining packets of the RDMA write.

In a further example, when the RDMA write LAST packet is encountered, it is forwarded, the host session is unlocked, and the state machine again waits for a new RDMA request.

Figure 9:
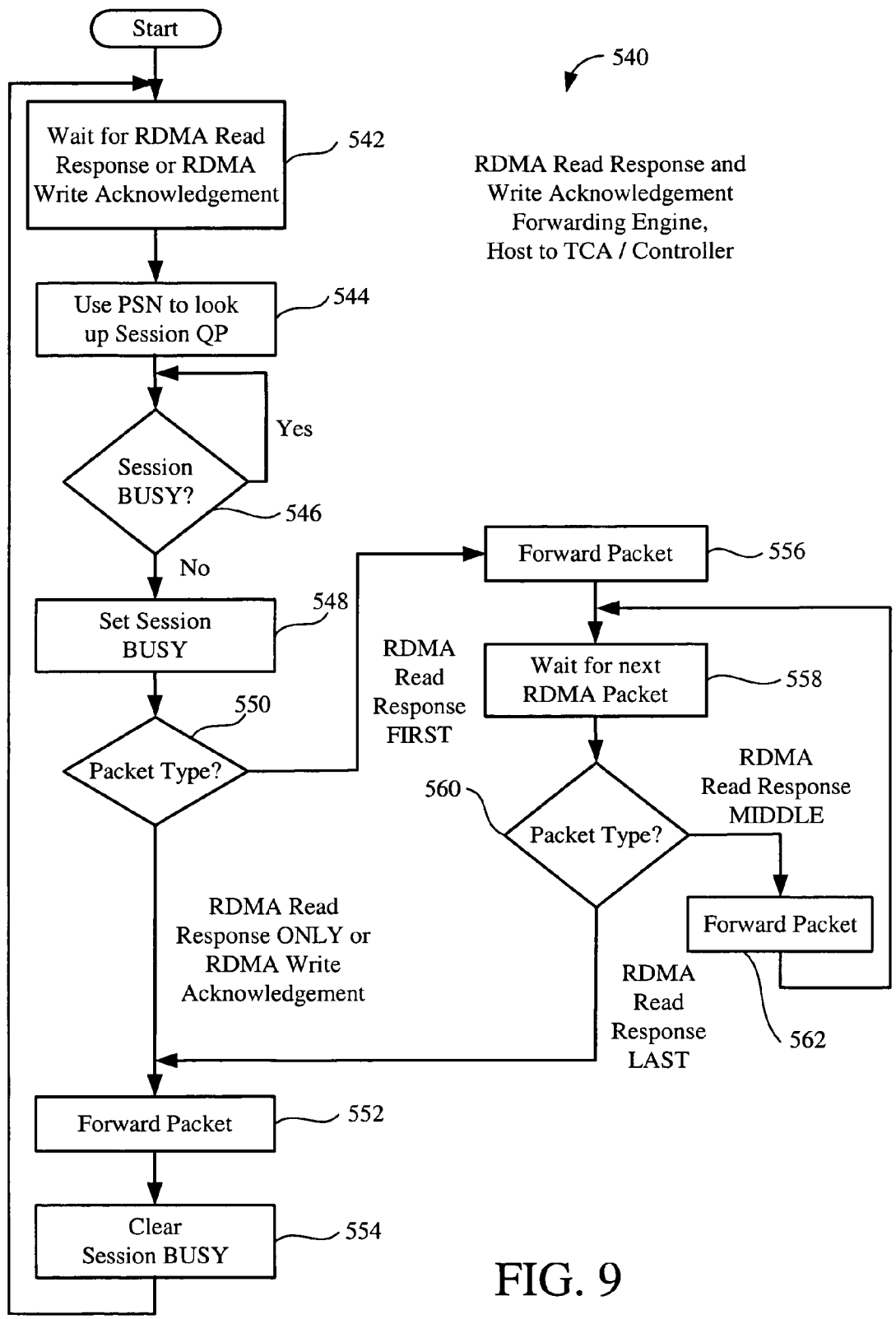
FIG. 9 illustrates a flowchart that shows a method for forwarding packets from a host to a TCA/Controller in accordance with one embodiment of the present invention.

FIG. 9 illustrates a flowchart 540 defining an operation of an RDMA response routing state machine where RDMA response packets are forwarded packets from a host to a TCA/Controller in accordance with one embodiment of the present invention.

In one embodiment, the flowchart 540 illustrates the operations needed to forward packets from a TCA-Router session to a Host-Router session.

In this embodiment, the method begins with operation 542 which waits for RDMA response or RDMA Write Acknowledgment. After operation 542, the method moves to operation 544 which uses PSN to look up session QP. Then operation 546 determines whether the session is busy. If the session is busy, operation 546 is repeated. If the session is not busy then the method moves to operation 548 which sets the session as being busy. After operation 548, the method moves operation 550 which determines a packet type. If the packet type is RDMA Response ONLY or RDMA Write Acknowledgement, then the method advances to operation 552 which forwards the packet. If the packet type is RDMA Response FIRST then the method moves to operation 556 which forwards the packet. After operation 556, the method moves to operation 558 which waits for next RDMA packet. After operation 558, the method moves to operation 560 which determines the packet type is an RDMA Response MIDDLE or RDMA Response LAST. If the packet type is RDMA Response MIDDLE, the method moves to operation 562 which forwards the packet. After operation 562, operations 558 and 560 are repeated. If the packet type as determined by operation 560 is RDMA Response LAST, the method moves to operation 552. After operation 552, the method proceeds to operation 554 which clears the host session BUSY message and returns to operation 542.

Therefore, FIG. 9 illustrates the operation of a RDMA response routing state machine. Conceptually there would be one of these for each Host-Router session QP supported by the router. When the QP received the FIRST or ONLY packet of an RDMA read response, the appropriate TCA-Router session's QP would be determined, and the session would be atomically locked. If the packet was a RDMA response ONLY packet, it would be forwarded, and then the lock would be released. Otherwise, the packet would be an RDMA response FIRST packet, and the session would remain locked while additional packets of the response were forwarded. When the RDMA response LAST packet arrived, it would be forwarded and then the session again unlocked.

Figure 10:
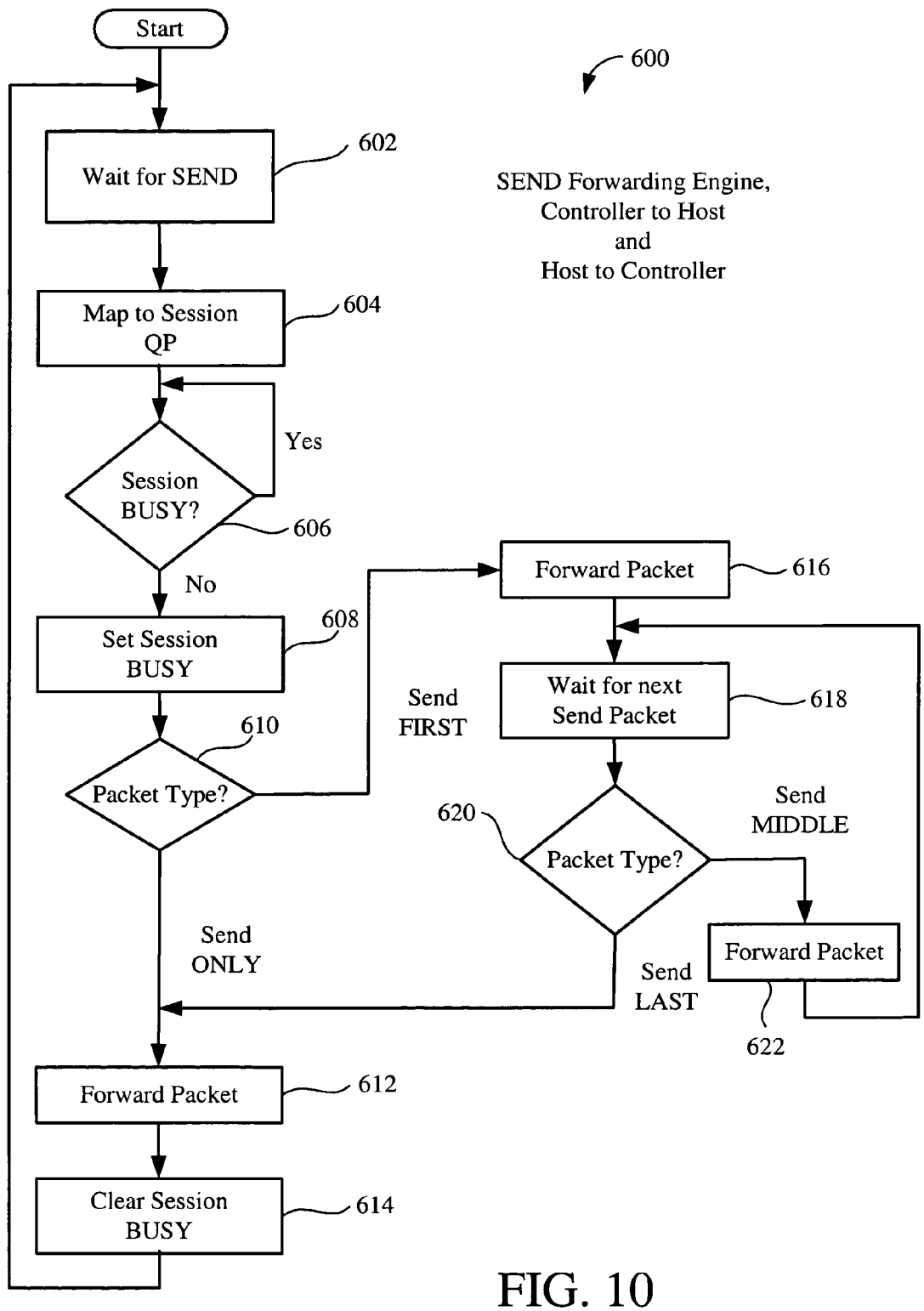
FIG. 10 shows a flowchart where message forwarding through the router is defined in accordance with one embodiment of the present invention.

FIG. 10 shows a flowchart 600 where message forwarding through the router is defined in accordance with one embodiment of the present invention. In one embodiment, the method begins with operation 602 which waits for a SEND packet. After operation 604, the method moves to operation 606 which determines if the session is busy. If the session is busy, the method returns to operation 604. If the session is not busy, the method moves to operation 608 which sets the session to BUSY. Then the method moves to operation 610 which determines packet type. If the packet type is SEND FIRST then the method moves to operation 616 which forwards packet. After operation 616, the method moves to operation 618 which waits for next SEND packet. After operation 618, the method proceeds to operation 620 which determines the packet type. If the packet type as determined by operation 620 is a SEND MIDDLE packet then the method advances to operation 622 which forwards the packet and repeats operation 618 and 620. If the packet type as determined by operation 620 is a SEND LAST packet then the method moves to operation 612 which forwards the packet. If operation 610 determined that the packet type is a SEND ONLY packet then the method moves to operation 612. After operation 612, the method proceeds to operation 614 which clears the session busy. Then the method moves back to operation 602.

As indicated below, routing of SEND messages operates very similarly to RDMA requests and responses, except for how the actual QP is determined. Otherwise, there is the same need to lock the outgoing session, and handle multiple packet messages. The exact routing method is specific to each architectural approach.

In the event that another RDMA request arrives from a different TCA or a message from the Controller while a current RDMA write is in progress, the router will have to delay the new RDMA request or message until the current one is finished. The packets from the new request could be held in local router buffers, if available. Alternatively, if the TCA-Router path is an RC session, then the request could just be delayed by withholding acknowledgements. But if the TCA-Router path is done with RD and no buffer space is available, the companion RD QP will have to return an RNR NAK.

Figure 11:
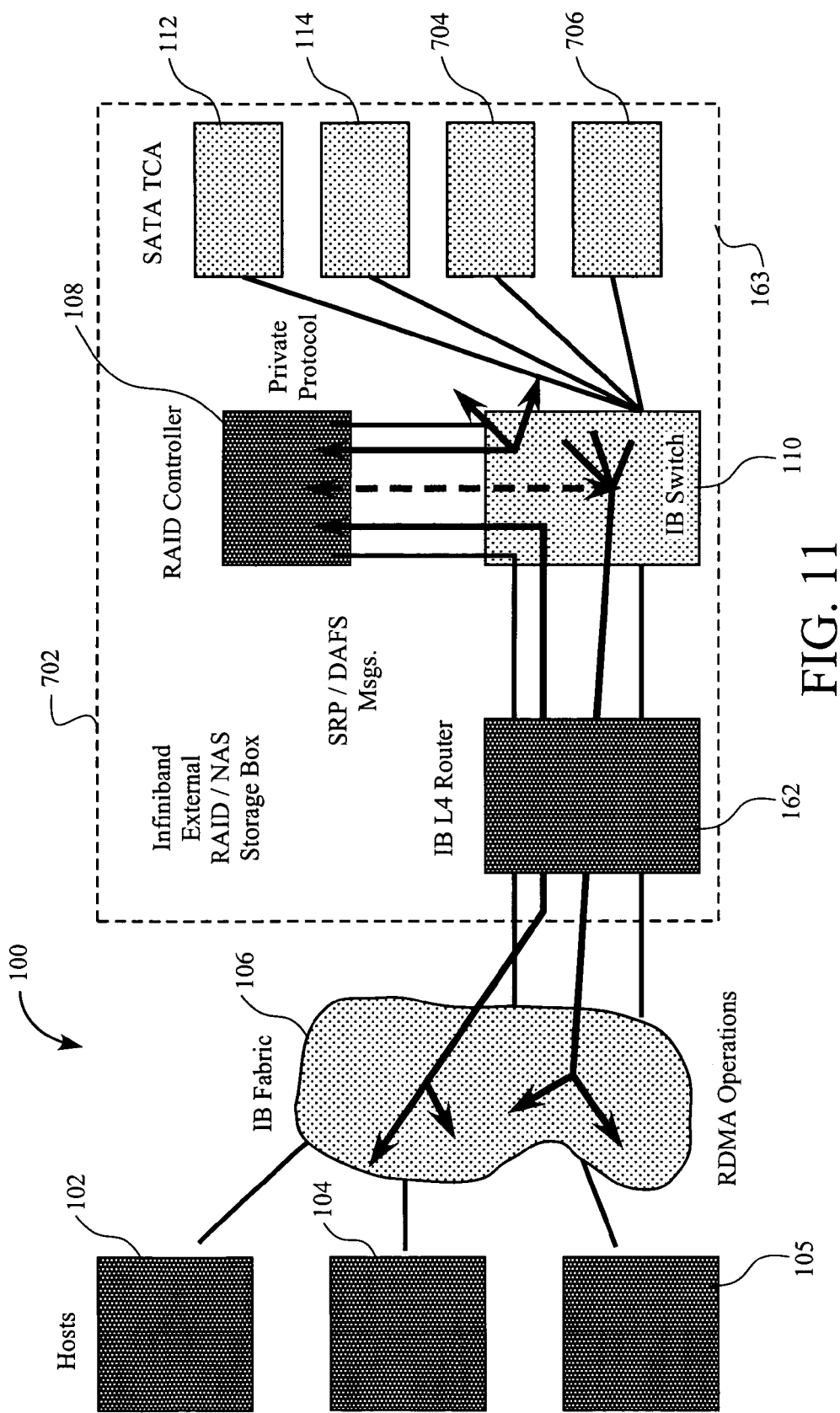
FIG. 11 shows an architecture of an InfiniBand system with external storage controller in accordance with one embodiment of the present invention.

FIG. 11 shows an architecture 700 of an InfiniBand system in accordance with one embodiment of the present invention. In one embodiment, hosts 102, 104, and 105 are connected to the L4 router 162 within the storage box 163 through the IB fabric 106. The storage box therefore includes the router 162 which is connected to the RAID controller 108 through an internal IB switch 110. The RAID controller as well as the L4 router 162 may communicated with TCA's 112, 114, 704, and 706.

While the various diagrams describing the different approaches would appear to require several specialized groups of QPs, the flexibility and applicability of the L4 router could be enhanced by equipping all QPs with the ability to do forward and reverse mapping of RDMA traffic and ability to be coupled to a companion QP. This would enable forwarding of RDMA traffic in both directions, and more flexibility in how message traffic is forwarded. If RD support is added as well, then actually any of the approaches can be implemented for the external storage box 163.

In one embodiment the L4 router 162 may have a chip with four ports, two "internal" and two "external". It should be appreciated that the chip may have any suitable number and types of ports depending on the application desired. Two external ports may be utilized so that they could be connected to different switches and provide fail-over as well as load balancing. However, since the four ports would have identical functionality, other configurations or applications would be possible.

Using a dedicated SATA to IB TCA chip rather than a generic PCI-IB chip and a PCI-SATA (or PCI-SCSI) chip can enhance the architecture 700. In particular, since SATA has a dedicated serial link to each drive, drives can be held off through link flow control if the TCA does not have the resources necessary to complete a transfer at a particular time. With SCSI, a host initiated disconnect would be used, which may not be supported by the drive, and even if it is, will not immediately stop data transfer. It may be even harder to do if an intermediate PCI bus is involved, and that compounds the problem of using a parallel SCSI interface to the disk drive. So, usage of an SATA-IB TCA chip may enhance the functionality of the architecture 700 as well as the other architectures described herein.

To achieve the lowest possible latencies, a design may be utilized which uses cut-through routing. So, disk reads may have to fill a whole packet (or terminate) before the packet can be sent off on the IB Fabric. Additionally, once an RDMA request starts on a given connection it must finish before another can begin. This implies that either requests are handled one request at a time, or several QP sessions occurs off the chip, each one dedicated to a particular RDMA read or write at a given time. For example, four data QPs may be used, and can be assigned to pending disk requests as the requests reach the data transfer phase. If more than four requests (because, for example, 8 SATA drives are attached) complete at before the first is finished, the last to complete will be held off with SATA flow control until a QP is freed up from an earlier request. The exact number may be any suitable number that would enhance resources and performance. In addition, disk writes (RDMA reads) can still be cut through, as the data is arriving at a faster, and predictable rate over the IB wire, at least on a per packet basis.

FIGS. 12 through 19 show exemplary embodiments of storage device configurations which enable optimal RAID controller usage where there is no single point of failure. Therefore, reliability of data storage may be enhanced and data transfer can be optimized. In addition, in one embodiment, L4 routers as described in reference to FIGS. 2 through 11 may be utilized in conjunction with Infiniband switches so RAID controllers do not have excessive data traffic. Moreover, by use of the L4 router in such a exemplary configuration, data transfer can be optimized due to RDMA transfers without the inherent problems of queue pair explosions. Therefore, the exemplary embodiments as described below keep controllers from becoming a reliability bottleneck in SATA RAID. It should be appreciated that RAID is well known to those skilled in the art and therefore, the basic concept, structure, and theory of RAID is not discussed in detail herein. It should also be appreciated that although the exemplary embodiments of FIGS. 12 through 19 are discussed in terms of a RAID configuration, the methods described herein may be utilized in any other types of suitable storage device configurations that are not RAID configurations. In addition, the methodology described herein may be utilized in any suitable RAID configuration in addition to the RAID configurations described herein.

Figure 12:
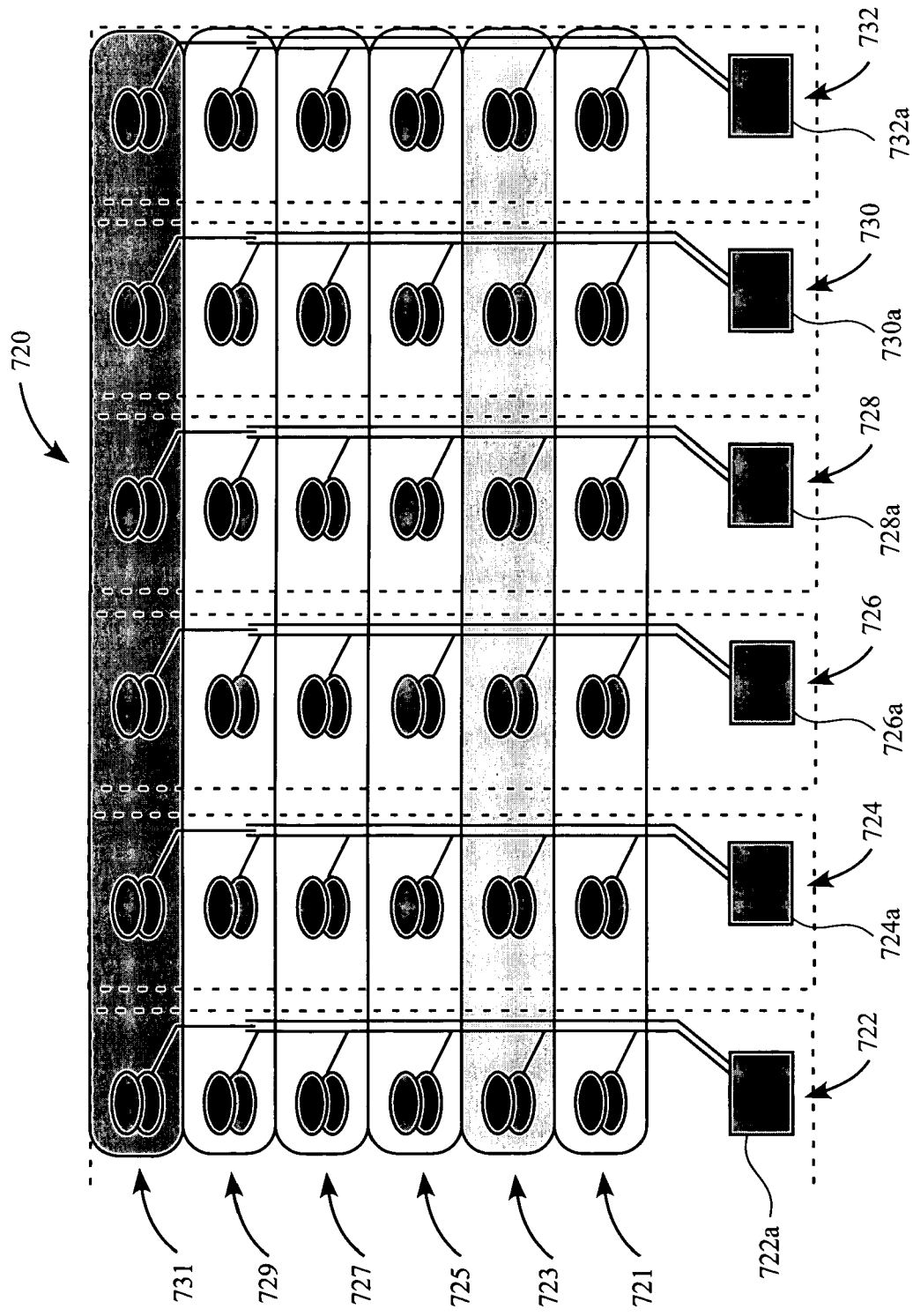
FIG. 12 shows a RAID system with a cross controller and drive bay stripe arrangement where striping is accomplished across disk boxes in accordance with one embodiment of the present invention.

FIG. 12 shows a RAID system 720 with a cross controller and drive bay stripe arrangement where striping is accomplished across disk boxes in accordance with one embodiment of the present invention. The configuration shown has six drive bays 722, 724, 726, 728, 730 and 732, indicated by the dashed boxes, each with six drives, with six volumes 721, 723, 725, 727, 729, 731 each of which uses one drive from each drive bay's set. If each volume is configured with RAID 5, then the failure of any one SATA controller or other drive bay electronics still allows access to all the data using the other five drive bays and reconstruction of some data through XOR operations. Once the SATA controller or drive bay is replaced, the original contents of the drives will need to be updated to account for any writes.

The boxes 722a, 724a, 726a, 728a, 730a, and 732a can represent either SATA-IB RAID controllers or SATA-IB bridge controllers. Because SATA is an "in the box" solution, each drive bay would need some sort of SATA controller and an external interface to the IB switched fabric. Whether the controller is RAID unit or a simple bridge depends on a variety of cost and performance issues.

The configuration of FIG. 12 can be implemented with a RAID controller per box, requiring six RAID controllers. In one embodiment, the task of managing RAID volumes and processing I/O request may be spread among all controllers. Therefore, this is one way where one point of failure does not affect the functionality of data storage in a significant way because if, for example, one controller becomes dysfunctional, other controllers can be utilized to store and read data from RAID drives.

Figure 13:
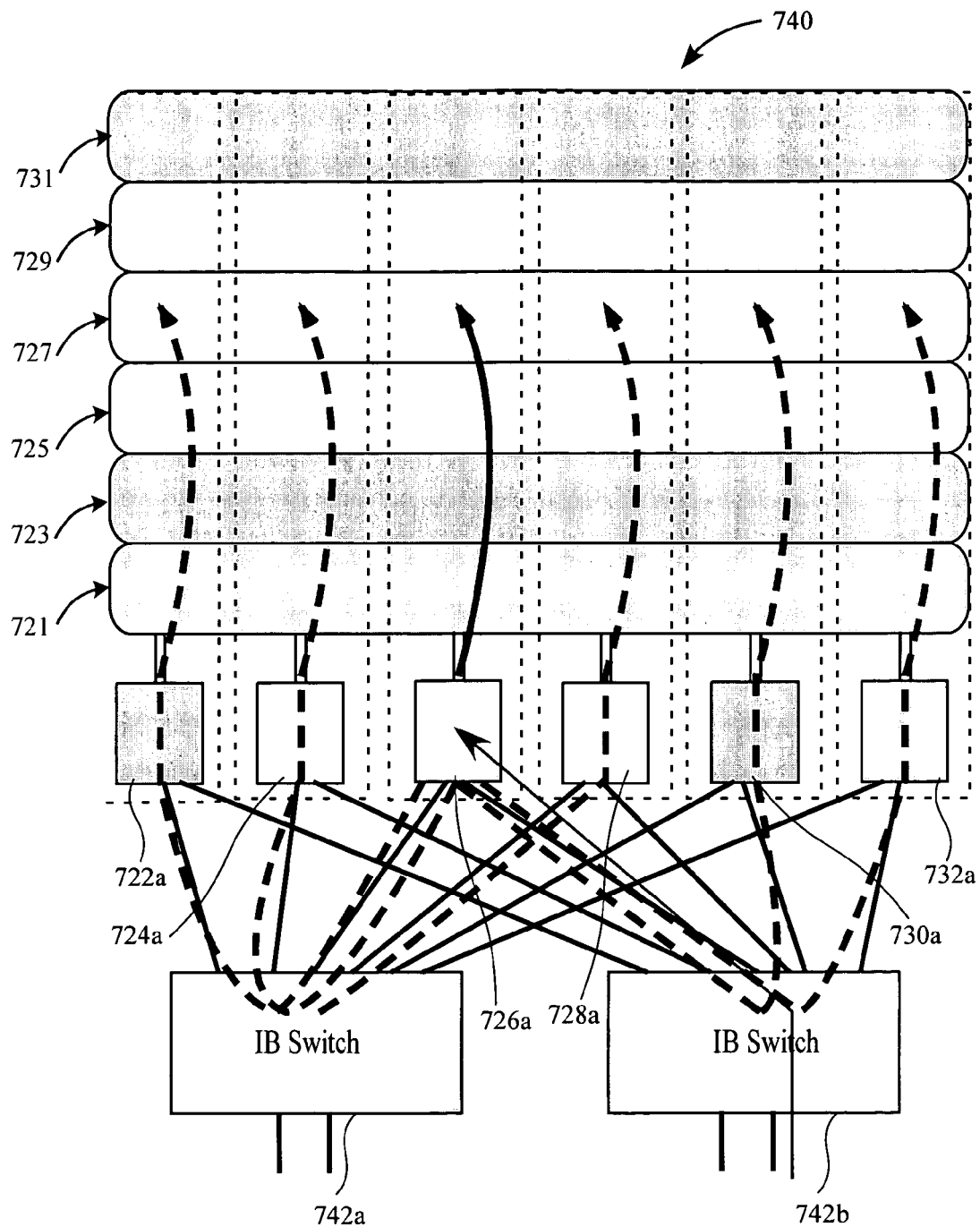
FIG. 13 shows a RAID system which assigns control of each RAID volume to a separate controller in accordance with one embodiment of the present invention.

FIG. 13 shows a RAID system 740 which assigns control of each RAID volume to a separate controller in accordance with one embodiment of the present invention. The volumes and the respective associated controllers have the same shading to indicate which volume is controlled by each controller. The volume 727 is controlled by the left middle controller 726a, which sends requests directly to the SATA drive on its string, and indirectly through the other RAID controllers (functioning in a pass through mode as indicated by the dashed lines) to the rest of the drives in its volume. To provide completely seamless operation, each controller can be paired with one other to provide active-active fail-over.

In one embodiment, five out of six disk drive requests are processed on adjacent RAID controllers. Such an embodiment utilizes a high speed interconnect, such as IB fabrics 742a and 742b. SRP requests from hosts for the volume 727 may be routed through the IB switches 740 and 742 to the controller 726a, which will then determine the actual disk operations necessary to service the requests. Any XOR and cache operations may also occur in the controller 726a. Disk operations destined for drives on other controllers can be passed to them through dedicated SRP sessions or some special purpose ATA version of SRP, where they are be passed through to the appropriate SATA drive. The actual data sent to or received from the drive can also pass through the controller 726a. Hence each RAID controller's PCI bus may see almost twice the amount of data as it otherwise would. This can occur because in such a configuration, each RAID controller's PCI bus may pass through data for other RAID cards as well as all of its own, even though much of it will head right back out the IB port.

It should be appreciated that any suitable type of interconnect fabric may be utilized. In one embodiment, if InfiniBand is used as the interconnect, the messaging features of IB could be used to make the six RAID controllers operate as a distributed cluster. This would allow distribution of some of the XOR functions to reduce the controller to controller traffic on RAID 5 writes. This would also allow pieces of a failed controllers work to be distributed to the other five, rather than dumped on one designated partner controller. It could also allow redistribution of work for load balancing and a single view of the entire storage unit. Therefore, RAID processing power scales with the number of drives and physical configuration is simple as there is only one type of drive bay to be concerned with. In addition, cluster technology could be used to present a single RAID controller view to the hosts, and provide load balancing between physical controllers and graceful degradation under failure.

If a RAID board with performance matched to the SATA drives in the bay can be built for not much more than the cost of an IB-SATA bridge, it could end up being the most cost effective system. In such an embodiment, software is added to enable the passthrough operations, and route active-active synchronization traffic through the fabric.

Additional software may be used to make the set of RAID controllers function as one large storage management cluster. Therefore, a single failure point does not stop the data transfer to and from storage devices.

Figures 14A, 14B:
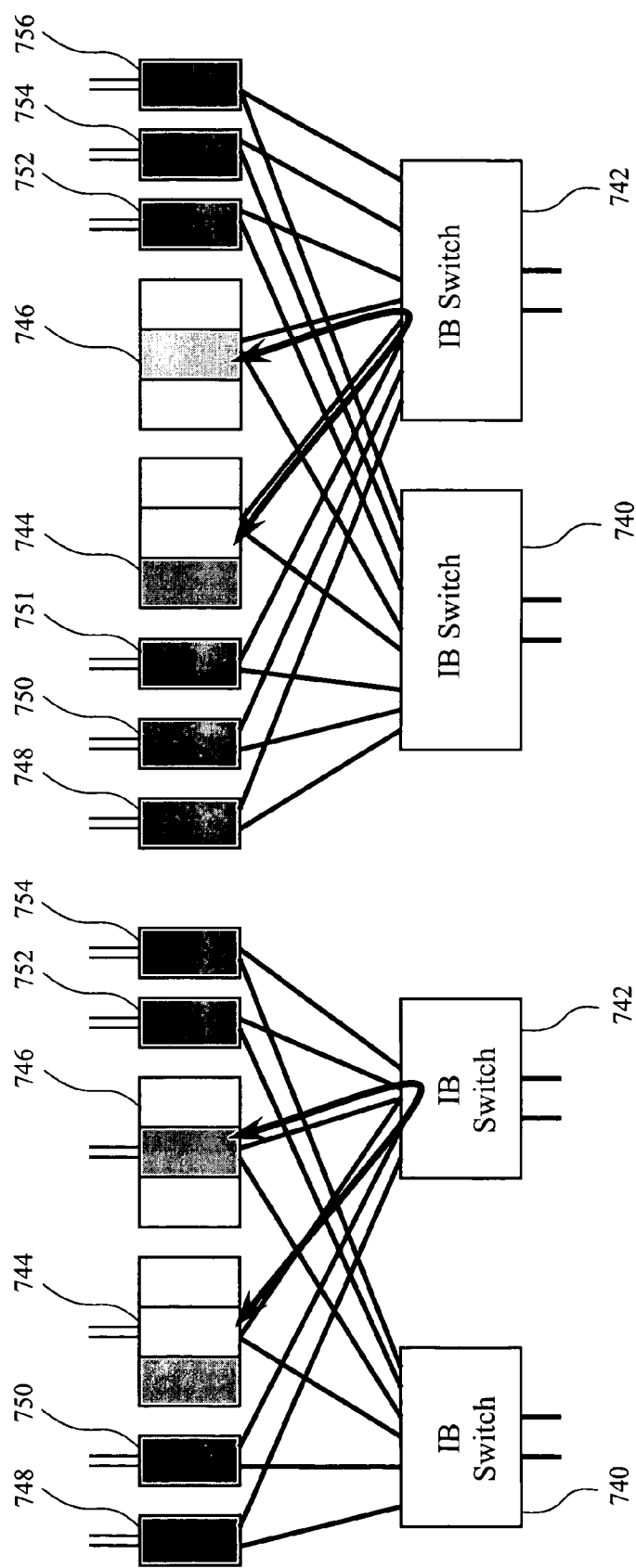
FIG. 14A shows use of dual switches and IB/SATA bridges in accordance with one embodiment of the present invention.
FIG. 14B shows a use of dual switches and IB/SATA bridges with a special purpose bridge chip to optimize transfer between the IB ports and the SATA ports in accordance with one embodiment of the present invention.

FIG. 14A shows use of dual switches 740 and 742 and IB/SATA bridges in accordance with one embodiment of the present invention. With many workloads, such as transactions processing, a single RAID controller such as, for example, RAID controllers 744 and 746 can handle far more than the 8 to 12 drives shown by the above architecture. By using IB to SATA bridge chips 748, 750, 752, and 754 in some, many, or all of the drive boxes, a system with only two or four RAID controllers, such as the system in FIG. 14A could be built. In this approach SRP requests from hosts would go to either of the two controllers 744 and 746, which would then direct disk operations to each other or the bridge chips 748, 750, 752, and 754 as appropriate. The IB interconnect could be used for cache synchronization communication between the two controllers 744 and 746, allowing them to operate in active-active mode. Finally, by including two IB switches, cross coupling can produce an external storage system with no single point of failure.

FIG. 14B shows a use of dual switches 740 and 742 where all direct drive connections may be removed from the RAID controllers 744 and 746 in accordance with one embodiment of the present invention. In one embodiment, IB/SATA bridges with a special purpose bridge chip may be utilized to optimize transfer between IB ports and SATA ports. Such a chip could provide reduced latencies compared to passing I/O through a RAID controller. Therefore all direct drive connections may be removed from the RAID controllers as shown in FIG. 14B, putting only IB to SATA bridges in the drive bays. The RAID controllers could be in a separate chassis, which in one embodiment is combined with IB switches. This approach may require more switch ports, though it also simplifies system configuration as there is only one drive bay type. Using RAID systems based on the architectures of FIGS. 14A and 14B can be inexpensive due to cost savings in the LB to SATA bridge chips. In addition, there may be less software development, as existing active-active code can be used. Moreover, when the embodiment of FIG. 14B is utilized, this architecture may require minimal changes to RAID code.

Figure 15B:
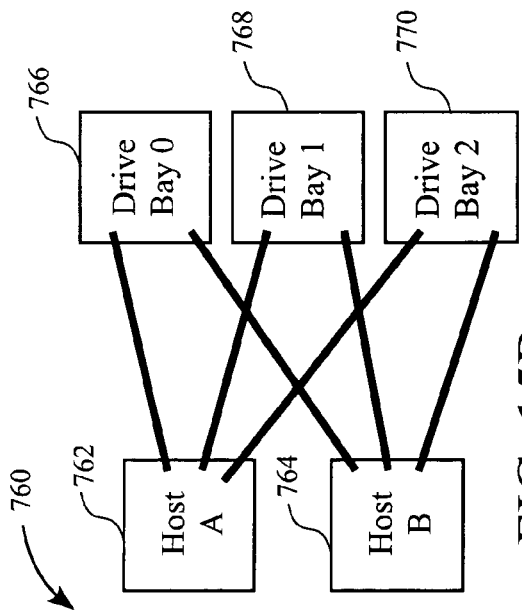
FIG. 15B shows an IB RC transport connection configurations in accordance with one embodiment of the present invention.
Figure 15A:
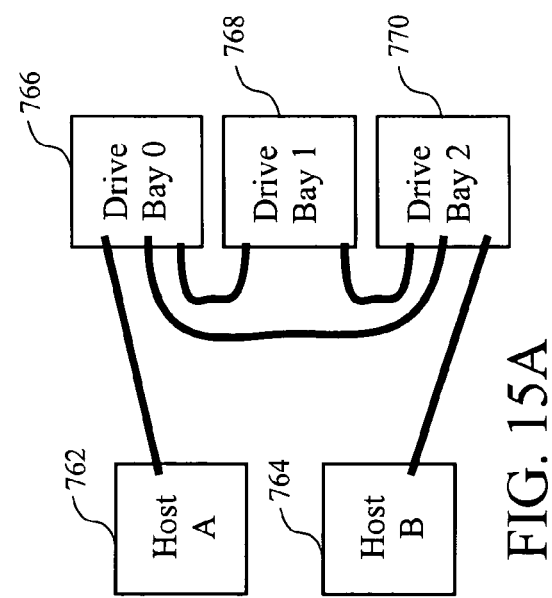
FIG. 15A shows a host SRP session connecting to one designated RAID controller in accordance with one embodiment of the present invention.

FIG. 15A shows a host SRP session connecting to one designated RAID controller in accordance with one embodiment of the present invention. In one embodiment, a host-A 762 is connected to drive bay-0 766. A host-B 764 is connected to drive bay-2 770. The drive bay-0 is also connected to a drive bay-1 768 and the drive bay-2 770. The drive bay-2 770 besides being connected to the host-B 764 and the drive bay-0 766 is also connected to the drive bay-1 768. All communications of data between controllers of the drive bays 766, 768, and 770 in this embodiment would be hidden from hosts. While such hiding is good in principal, as it reduces the number of IB transport connections required to the hosts 762 and 764, it may require two hops for most data movement because there may be data movement between the drive bays before data is transmitted to one of the hosts 762 and 764. This in turn adds delay and puts an additional load on the PCI busses that are internal to the controllers. There are two possible ways to prevent this, by providing IB transport connections from each bridge or controller to each host, or by providing a transport level (L4) router with each external link.

FIG. 15B shows an IB RC transport connection configurations in accordance with one embodiment of the present invention. The configuration shown by FIG. 15B includes the host 762 and the host 764 each connected by its own RC to each of drive bays 766. By providing a separate RC session between each host and every Bridge or RAID controller that it might need to access, the controller to controller data hops as shown in FIG. 15A could be eliminated. Therefore, data may flow directly from any one of the drive bays 766, 768, and 770 directly to the hosts 762 and 764.

In one embodiment of the configuration shown in FIG. 15B, SRP requests are sent to the principal RAID controller for the volume, and it instructs other bridge or RAID controllers to access the specific disk blocks as before. However, the data is transmitted directly between the bridges or RAID controllers and the hosts via RDMA over the direct RC sessions, thus avoiding a hop through the principal RAID controller. In one embodiment, the RAID controllers are located within each of the drive bays 766, 768, and 770. This serves to greatly reduce traffic through the principal RAID controller, and also reduces the traffic put on the storage unit's InfiniBand fabric. The principal RAID controller is the controller which may know the location(s) of the data being requested by the host. The configuration shown also reduces latency by avoiding a conversion from IB to PCI and back. In such a configuration, RC sessions and their associated Queue Pairs (QP) can start to increase to detrimental levels in complicated systems requiring high HCA resources. The configuration may also require the ability for a single SRP session to use a group of RC sessions for data transport where the host may see one logical SRP session that would consist of a set of RC sessions connected to all the relevant RAID and Bridge controllers.

Figure 15C:
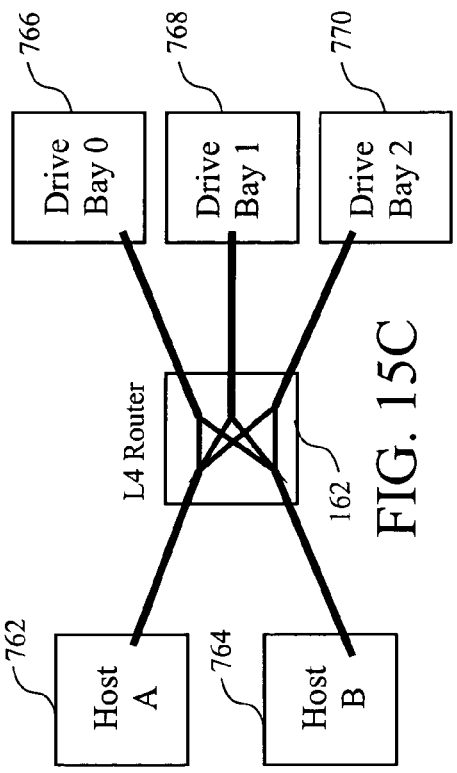
FIG. 15C shows an IB RC transport connection using intermediate transport layer routing in accordance with one embodiment of the present invention.

FIG. 15C shows an IB RC transport connection using intermediate transport layer routing in accordance with one embodiment of the present invention. In one embodiment, the IB RC transport connection includes a transport level (L4) router chip to facilitate data transfer in the system. The L4 chip may be of any suitable L4 router apparatus that can utilize L4 routing as described in further detail above in reference to FIGS. 2 through 11. Such a chip would enable moving data using RDMA between a host and various drive bays to travel over a single RC session between the host and the router, while traveling over a set of direct RC sessions between the router and the drive bays. The router chip can switch RDMA traffic between RC sessions, but the net result is illustrated in FIG. 15C. In one embodiment, the router to drive bay RC sessions are able to carry RDMA traffic for both hosts, with the router switching the traffic to the appropriate host to router RC session. In a large system this could save hundreds of RC sessions and their associated QPs.

For this comparison, assume there are H hosts, each with P processes communicating directly with storage, and B drive bays in the storage subsystem. It should be appreciated that depending on the storage system, the numbers H, P, and B may be any suitable number and the numbers discussed below are for exemplary purposes only. Presumably a large storage unit would connect to several tens of hosts, yielding typical values for H of 5-30. For block storage such as SRP provides, the only entity communicating directly with storage would probably be a kernel driver, so P could be as little as 1. However, if a file system interface, such as DAFS provides, were used, each user process in the system might be in communication with storage, so P could be in the hundreds. The number of drive bays, B, can range from 4 for a small storage subsystem, to a few tens of bays for a large one. In addition, all three approaches as shown in FIGS. 15A through 15C require a same set of RC sessions for sending control and disk request information between bays, with the approach in FIG. 15A requiring data forwarding as well between drive bays by the set of RC sessions.

A key parameter is the number of host to storage unit RC sessions required. The configurations of FIGS. 15A and 15C only require P such sessions per host, while the configuration of FIG. 15B requires P*B, which could be in the thousands for expected values of P and B. Similarly, the configuration of FIG. 15B requires H*P RC sessions at the target end, which may potentially number in the thousands, in addition to any inter bay sessions. With SRP, where P may be as little as 1, and a medium size storage subsystem, these values may be acceptable. But with large numbers of hosts and DAFS, the numbers of required sessions could exceed the number of QPs available on HCAs (at the hosts) and TCAs (at the drive bays).

With regard to latency, passing data through intermediate controllers, as in the configuration of FIG. 15A, could add significant latency, especially if the data had to be copied to memory in those controllers. This source of latency is not present in configurations of FIGS. 15B and 15C, though FIG. 15C does incur one extra switch delay in the L4 router. In one embodiment, with cut through routing this delay may be minimal.

A line of external storage products based on the architectures and configurations described herein can range from a single SATA RAID controller equipped drive bay to a full rack of drives and controllers. Similarly, the embodiments described herein ranges from the software only approach of an IB-SATA RAID controller per bay, to an IB-SATA bridge and L4 IB router based system.

Therefore, in one embodiment a single SATA drive bay with RAID controller can provide full protection for the stored data, though not continuous availability because of the single RAID controller. In another embodiment, several drive bays with a pair of IB switches may provide full, continuous availability through cross bay striping. RAID controller software may be provided which may allow each RAID controller to operate with the others as a cluster, providing the rest of the system with a large, single RAID box. The embodiment as described in detail in reference to FIG. 16 is a preferable embodiment which enables enhanced data handling features.

Figure 16:
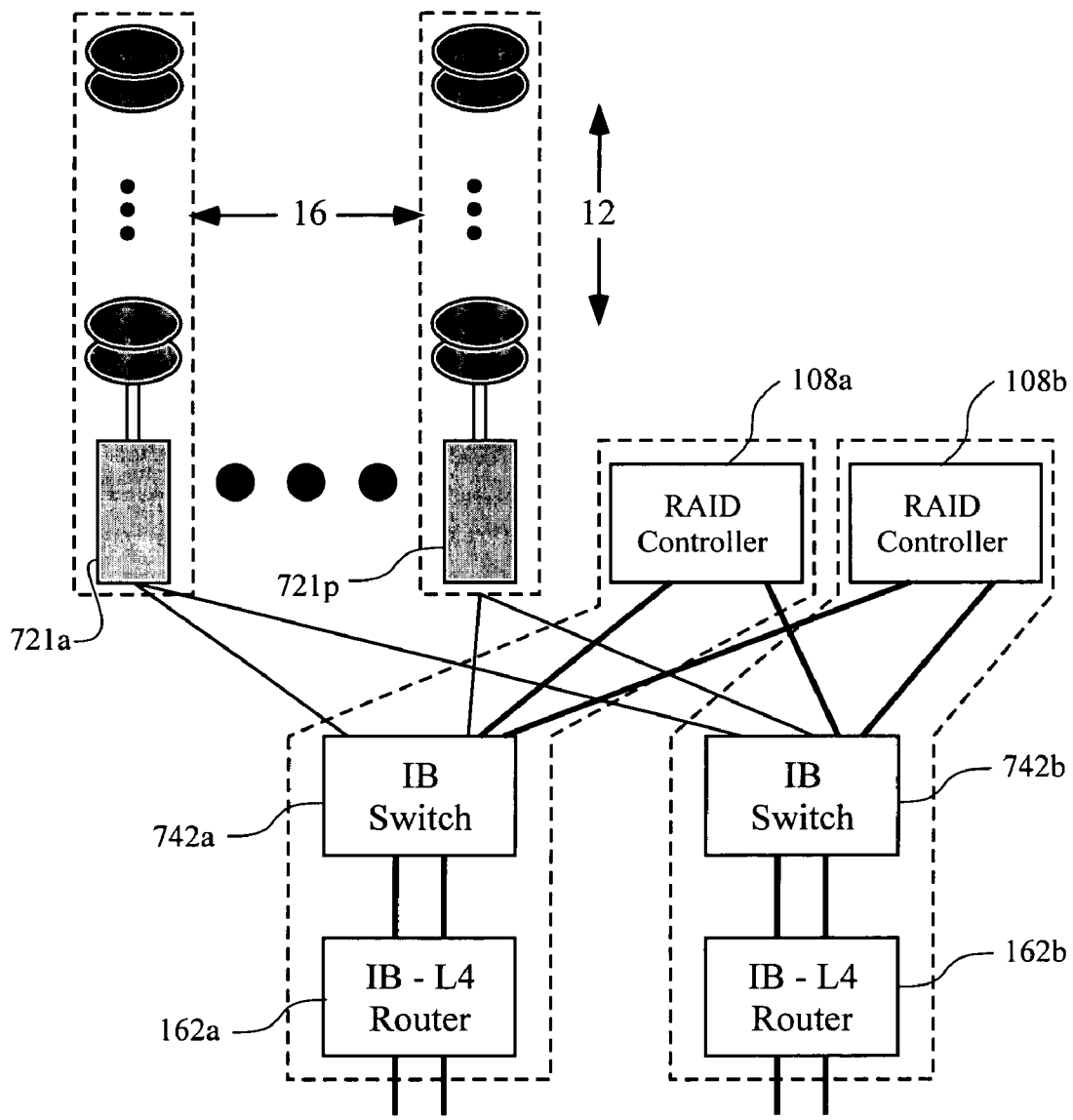
FIG. 16 shows an L4 router storage system in accordance with one embodiment with the present invention.

FIG. 16 shows an L4 router storage system in accordance with one embodiment with the present invention. It should be appreciated that the system shown in FIG. 16 is exemplary in nature, and any suitable storage system configuration may be utilized that incorporates the L4 routing as described above in reference to FIGS. 2 through 11 to prevent a single point of failure in the storage system. The LA router storage system may combine the IB-L4 router 162 chip with the IB-SATA bridge chips. In one embodiment, a least a pair of high performance RAID controllers may be connected to at least a pair of IB switches and 10's of SATA JBODS. In one example of such an embodiment, IB-L4 routers 162a and 162b may be connected to IB switches 742a and 742b respectively. The IB switches 742a and 742b may each connect to RAID controllers 108a and 108b as well as storage devices 721a through 721p. In one embodiment, the storage devices 721a through 721p may be "Just a bunch of drives" (JBOD). Each JBOD may consist of twelve SATA drives connected to a dual ported IB-SATA bridge. In an exemplary embodiment as shown in FIG. 16, the bridge ports are assumed to be 1×, as dual 1× ports would be sufficient for most workloads, and each switch is configured with sixteen 1× ports, and four 4× ports. If 4× bridge ports or more SATA JBODS are desired, more switches may be added. The RAID controllers have dual 4× ports and the remaining two 4× ports on each switch connect to the rest of the InfiniBand network. In one embodiment, the dashed lines indicate possible packaging, with each set of twelve disks and bridge in a rack mount unit, and each switch-RAID controller pair in an individual rack mount unit. Note that this arrangement means that a failed power supply can be tolerated, just like any other failed component, so no special redundant power supplies are required. FIG. 16 also shows how a pair of the L4 InfiniBand routers 162a and 162b (such as, for example, router chips) could be added to the switch-RAID controller boxes to allow direct data traffic between the hosts and the drive bays. As discussed earlier, this approach may require the manufacture of special chips, however this would be a preferable approach for a large RAID system.

To summarize, an initial high end, fully fault-tolerant storage subsystem can be constructed out of IB to SATA units through the addition of a couple of IB switches and some appropriate software. Adding an IB-SATA bridge chip or card would allow a larger ratio of drives to RAID controllers for greater scaling and reduced cost. Finally, adding a couple of IB-L4 router chips would significantly improve the scalability of the design by reducing data traffic through the RAID controllers while keeping the number of host to storage box RC sessions at a minimum.

The layer 4 routing may be accomplished by the any of the embodiments of the methodology as described above in reference to FIGS. 3 through 11. Therefore, by using the powerful L4 routing, data may be transferred directly between a host and a storage device in an extremely efficient manner. The type of L4 routing that may be used can be any of the methods described herein such as, for example, the L4 routing as described above in reference to FIGS. 3 through 11.

The method described in FIG. 17 below shows embodiments where data may be written to storage device(s) and data may be read from storage device(s) using L4 routing. The layer 4 routing as described in FIG. 17 may be accomplished by the any of the embodiments of the methodology as described above in reference to FIGS. 3 through 11. Therefore, by using the powerful L4 routing, data may be transferred directly between a host and a storage device in an extremely efficient manner. The type of L4 routing that may be used can be any of the methods described herein such as, for example, the L4 routing as described above in reference to FIGS. 3 through 11.

Figure 17:
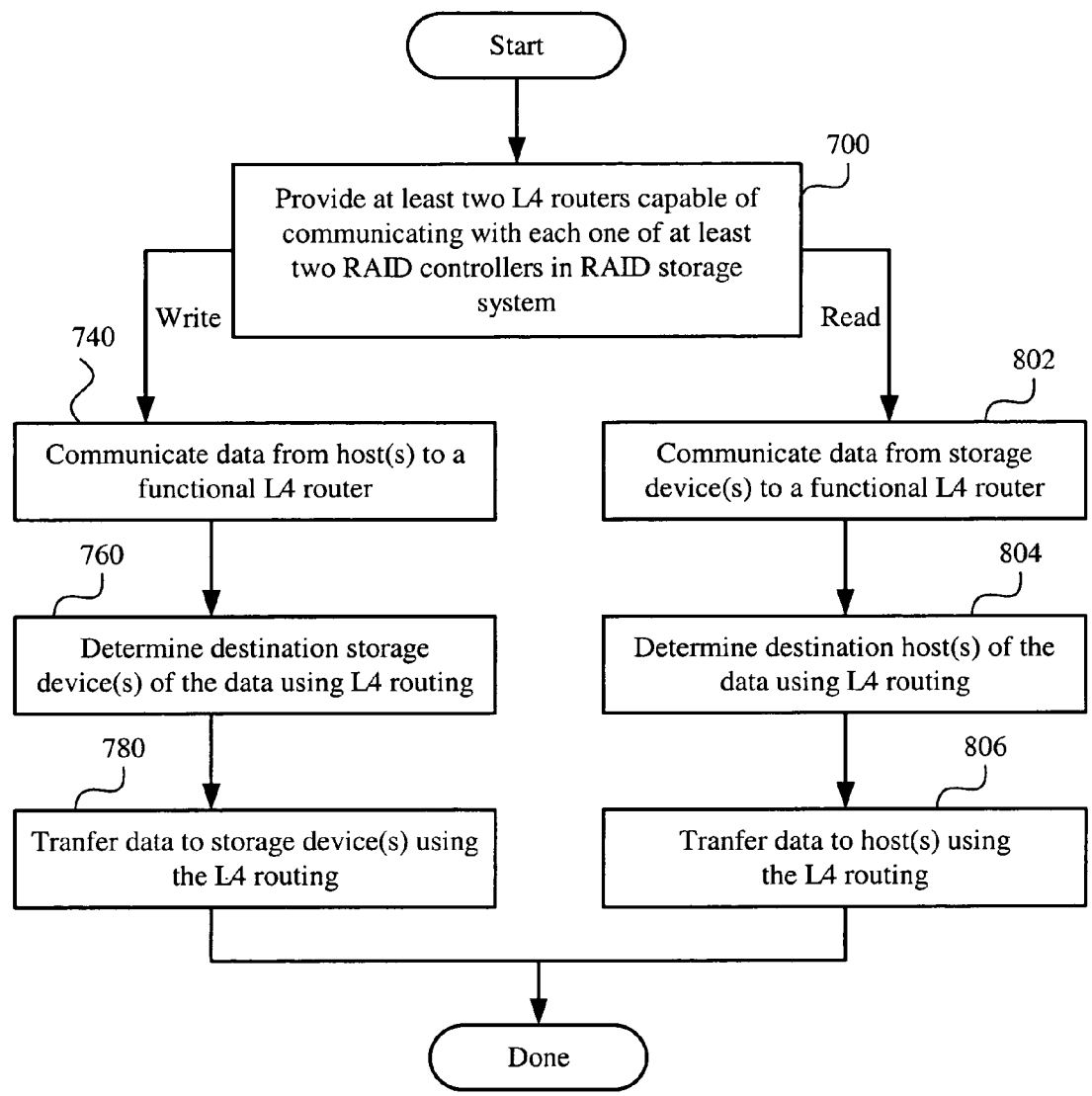
FIG. 17 illustrates a method defining the L4 routing of data to and from a storage device in accordance with one embodiment of the present invention.

FIG. 17 illustrates a method defining the L4 routing of data to and from a storage device in accordance with one embodiment of the present invention. In one embodiment, the method begins with operation 700 where at least two L4 routers capable of communicating with each one of at least two RAID controllers in a RAID storage system are provided. By having at least two L4 routers and at least two RAID controllers, even if one of the routers or the controllers fail, the method can use the other router or controller to transfer data.

If a data write operation is being conducted, the method moves to operation 740 where data is communicated from a host(s) to a functional L4 router. It should be appreciated that the method described herein may manage, direct, store, and retrieve any suitable type of data. In one embodiment, a host (or hosts) has desired to initiate a write operation to a storage device(s) and the data to be stored is received by an L4 router that can transfer data to the storage device(s). It should also be appreciated that the data may be received from any suitable computing device such as, for example, host(s) that desire to store data on storage device(s). It should also be appreciated that the storage devices utilized may be any suitable device that can store data such as, for example, hard disk drives, floppy disk drives, CDR-W's, CDR's, flash memory devices, etc.

After operation 740, the method advances to operation 760 which determines destination storage device(s) of the data using L4 routing. In one embodiment of operation 740, the method utilizes layer 4 routing (also known as level 4 routing) to direct data to the appropriate destination storage device(s). Therefore, in one embodiment, the functional L4 router may utilize a functional IB switch and a functional RAID controller to direct data the appropriate storage device as described above in reference to L4 routing methods described above.

Then the method moves to operation 780 where data is transferred to a storage device(s) using the L4 routing. It should be appreciated that the storage device(s) used in the methodology described herein may be any suitable type of storage device(s) such as, for example, hard disk drives, floppy disk drives, CD-R's, CD-RW's, USB drives, RAID arrays, etc. In one preferable embodiment, RAID arrays are utilized for the storage device(s) so data may be protected and easily retrieved in cases of a storage device controller failure. Therefore, in an exemplary embodiment, a structure such as, for example, as described in reference to FIG. 16 may be utilized so data transfer may continue even with a single RAID controller failure. As explained above, the L4 routing may be used to transmit data using RDMA without queue pair explosions. Therefore, by use of L4 routing, the present invention may be prevent a single point of failure in a RAID system while enabling incredible efficiency in data transmission.

If a read operation is being conducted, the method proceeds from operation 700 to operation 802 which communicates data from storage device(s) to a functional L4 router. The methodology described herein may be utilized in any suitable configuration using any suitable number of L4 routers and RAID controllers in cases where a RAID configuration is utilized. In a preferable embodiment, more than one L4 router and more than one RAID controller may be utilized so a single point of failure does not occur. In such a fashion, if one L4 router and/or one RAID controller fails, the other L4 router and the other RAID controller can be used to direct data to the appropriate destination in a manner consistent with the methodology described herein.

It should be appreciated that depending on the configuration of the storage device(s), the data may be retrieved from one or more storage devices. In a RAID embodiment, the data to be retrieved may be stored in one or more individual storage devices. In another embodiment, the data may be stored on logical storage units which may include one or more physical storage devices. Therefore, the methodology described herein may be extremely flexible in use.

Also, in one embodiment of operation 802, any number of RAID controllers may be utilized along with corresponding L4 routers depending on the number of RAID devices connected to the system. As a result, even if one of the RAID controllers and/or the corresponding L4 routers fail, at least one other RAID controller and at least one other L4 router can direct data to and from the storage units. Consequently, there is no single point of failure in the storage system as described. In addition, by use of the L4 routing, queue pair explosions can be greatly reduced when RDMA is utilized as described above thereby enabling efficient data transfer and management.

After operation 802, the method moves to operation 804 which determines destination host(s) of the data using L4 routing. In one embodiment of operation 802, multiple RAID controllers may be utilized along with corresponding LA routers. In such an embodiment, even if one of the RAID controllers and/or the corresponding LA routers fail, at least one other RAID controller and at least one other L4 router can direct data to and from the storage units. Consequently, there is no single point of failure in the storage system as described.

Then, operation 804 transfers data to host(s) using the L4 routing. Therefore, operation 804 is used where data from a storage device is sent to the host(s). In one embodiment, the data is transferred to the host(s) using L4 as described above in reference to FIGS. 3 through 11 above. As a result, RDMA may be utilized to enhance data transmission so a RAID processor is not accessed during an actual data writing process. In addition, by use of the L4 router, queue pairs may be decreased and data transfer efficiency may be optimized. The exact type of the L4 routing utilized may be application dependent as long as data is routed in an optimal manner as described herein. By use of the L4 routing, efficient data transfer and management is enabled and by having multiple L4 routers, a single point of failure is avoided.

The present invention may be implemented using an appropriate type of software driven computer-implemented operation. As such, various computer-implemented operations involving data stored in computer systems to drive computer peripheral devices (i.e., in the form of software drivers) may be employed. These operations are those requiring physical manipulation of physical quantities. Usually, though not necessarily, these quantities take the form of electrical or magnetic signals capable of being stored, transferred, combined, compared and otherwise manipulated. Further, the manipulations performed are often referred to in terms such as ascertaining, identifying, scanning, or comparing.

Any of the operations described herein that form part of the invention are useful machine operations. Any appropriate device or apparatus may be utilized to perform these operations. The apparatus may be specially constructed for the required purposes, or it may be a general purpose computer selectively activated or configured by a computer program stored in the computer. In particular, various general purpose machines may be used with computer programs written in accordance with the teachings herein, where it may be more convenient to construct a more specialized apparatus to perform the required operations.

Although the foregoing invention has been described in some detail for purposes of clarity of understanding, it will be apparent that certain changes and modifications may be practice within the scope of the appended claims. Accordingly, the present invention is to be considered as illustrative and not restrictive, and the invention is not to be limited to the details given herein, but may be modified within the scope and equivalence of the appended claims.

What is claimed is:

1. A method for storing data, comprising:
   transmitting a storage operation request to one of at least two controllers, the at least two controllers being capable of managing communication with a plurality of targets;
   directing the storage operation request to an operational one of the at least two controllers when the one of at least two controllers is inoperable through an L4 router, the directing including,
      generating an external queue pair (QP) for establishing communication between the L4 router and an external host through a reliable connection (RC) session, and
      generating internal queue pairs, one of the internal queue pairs being coupled with the external queue pair, the internal queue pairs establishing communications between the at least two controllers and an internal target device, between the L4 router circuitry and the at least two controllers, and between the L4 router circuitry and the internal target device by using reliable datagram (RD) sessions; and
   processing the storage operation request with the operational one of the at least two controllers.

2. A method for storing data as recited in claim 1, further comprising:
   communicating data for storage operations using to the at least two controllers through a network fabric interconnect.

3. A method for storing data as recited in claim 1, further comprising:
   communicating data between at least one storage device and at least one host using the operational one of the at least two controllers.

4. A method for storing data as recited in claim 1, wherein the storage operation request is one of a request to store of data to a target and a request to read data from a target device, the target device being a storage device.

5. A method for storing data as recited in claim 1, wherein the directing of the storage operation request includes the storage operation request through an L4 router.

6. A method for storing data as recited in claim 5, wherein the transmitting the storage request includes communicating data between a host and at least two storage devices through one of at least two L4 routers and one of the at least two controllers wherein an operable one of the at least two L4 routers is used when one of the at least two L4 routers is inoperable, the at least two L4 routers being capable of facilitating remote direct memory access (RDMA) communications between the at least two target devices and the host wherein the router uses information at a transport layer to route data between transport sessions.

7. A method for storing data as recited in claim 2, wherein the network fabric interconnect is an InfiniBand-type fabric, and the at least two controllers are RAID controllers.

8. A method for storing data as recited in claim 7, wherein the transmitting the storage operation request includes transmitting the request through an operational one of at least two bridge chips.

9. A method for storing data as recited in claim 8, wherein the at least two bridge chips are SATA-IB chips.

10. A method for storing data as recited in claim 2, wherein the directing the storage operation request includes determining a correct path through the network fabric interconnect to a proper storage device.

11. A method for storing data, comprising:
providing a plurality of storage containers, each one of the plurality storage containers having a plurality of storage devices;
generating a plurality of storage volumes where each one of the storage volumes includes at least one storage device from each one of the plurality storage containers;
managing each of the plurality of volumes with a corresponding storage device controller; and
when the corresponding storage device controller is inoperable,
accessing data on the plurality of storage volumes through at least one operable storage device controller that is configured to access the volume managed by the inoperable storage device controller, the accessing through an L4 router, and including,
generating an external queue pair (QP) for establishing communication between the L4 router and an external host through a reliable connection (RC) session, and
generating internal queue pairs, one of the internal queue pairs being coupled with the external queue pair, the internal queue pairs establishing communications between the at least two controllers and an internal target device, between the L4 router circuitry and the at least two controllers, and between the L4 router circuitry and the internal target device by using reliable datagram (RD) sessions.

12. A method for storing data as recited in claim 11, further comprising:
assigned control of each of the plurality of storage volumes to a corresponding separate controller.

13. A method for storing data as recited in claim 11, further comprising:
when a controller for a particular storage container fails,
accessing data located on other storage containers through XOR operations.

14. A method for storing data as recited in claim 11, further comprising:
managing the plurality of storage volumes by spreading the processing of input/output requests among all of a plurality of controllers, each of the plurality of controllers controlling a corresponding one of the plurality of storage volumes.

15. A method for storing data as recited in claim 11, wherein the storage containers are RAID devices.

16. A method for storing data as recited in claim 11, wherein the storage devices are disk drives.

17. A method for transmitting data in a data storage system with at least two RAID controllers and at least two L4 routers, comprising:
determining functionality of the at least two L4 routers;
during a read operation,
communicating the data from a storage device to a functional L4 router;
determining at least one destination host for the data,
transferring the data to the at least one destination host using L4 routing; and
during a write operation
communicating the data from a host to a functional L4 router,
determining at least one destination storage device for the data,
transferring the data to the destination storage device using L4 routing, wherein the transferring includes,
generating an external queue pair (QP) for establishing communication between the L4 router and an external host through a reliable connection (RC) session, and
generating internal queue pairs, one of the internal queue pairs being coupled with the external queue pair, the internal queue pairs establishing communications between the at least two controllers and an internal target device, between the L4 router circuitry and the at least two controllers, and between the L4 router circuitry and the internal target device by using reliable datagram (RD) sessions.

18. A method for transmitting data in a storage system as recited in claim 17, wherein communicating the data from a storage device to a functional L4 router and communicating the data from the host to the functional L4 router includes transmitting the data through an SATA-IB bridge and a network fabric.

19. A method for transmitting data in a data storage system as recited in claim 17, wherein the network fabric is an InfiniBand-type fabric.

20. A method for transmitting data in a data storage system as recited in claim 17, wherein the L4 routing includes using RDMA data transfer.

21. A storage network architecture, comprising:
at least two target devices;
at least two controllers for managing the at least two target devices, each of the at lest two controllers configured to be capable of managing the at least two target devices when one of the at least two controllers is inoperable;
at least two switches connecting the at least two controllers and the at least two target devices; and
at least two L4 routers, each one of the at least two L4 routers being capable of communicating data between a host and the at least two target devices through one of the at least two switches and one of the at least two controllers, the L4 router being capable of facilitating remote direct memory access (RDMA) communications between the at least two target devices and the host wherein the router uses information at a transport layer to route data between transport sessions the at least two L4 routers including,
circuitry for generating an external queue pair (QP) for establishing communication between the L4 routers and the host through a reliable connection (RC) session, and
circuitry for generating internal queue pairs, the internal queue pairs establishing communication between the L4 routers and the at least two controllers, between the at least two controllers and the at least two target devices, and between the L4 routers and the at least two target devices by using reliable datagram (RD) sessions.

22. A network architecture as recited in claim 21, wherein each one of the at least two L4 routers utilizes at least one internal queue pair to communicate with at least one external queue pair of the host.

23. A network architecture as recited in claim 21, wherein the at least two controllers are RAID controllers.

24. A network architecture as recited in claim 21, wherein the plurality of targets is a plurality of storage devices.

25. A network architecture as recited in claim 21, wherein the plurality of storage devices is a plurality of disk drives.

26. A network architecture as recited in claim 21, wherein when one of the at least two L4 routers is inoperable, the inoperable one of the least two L4 routers is capable of communicating data between the host and at least two target devices.

27. A network architecture as recited in claim 21, wherein one of the at least two switches is inoperable, the inoperable one of the at least two switches is capable of communicating data between the host and at least two target devices.

* * * * *